United States Patent
Segami et al.

(10) Patent No.: US 11,123,603 B2
(45) Date of Patent: Sep. 21, 2021

(54) MOTION MEASUREMENT APPARATUS, INFORMATION PROCESSING APPARATUS, AND MOTION MEASURING METHOD

(71) Applicant: Sony Corporation, Tokyo (JP)

(72) Inventors: Masahiro Segami, Kanagawa (JP); Hidetoshi Kabasawa, Kanagawa (JP); Kosei Yamashita, Kanagawa (JP); Sho Murakoshi, Tokyo (JP); Tomohiro Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 16/093,006

(22) PCT Filed: Mar. 29, 2017

(86) PCT No.: PCT/JP2017/012807
§ 371 (c)(1),
(2) Date: Oct. 11, 2018

(87) PCT Pub. No.: WO2017/179423
PCT Pub. Date: Oct. 19, 2017

(65) Prior Publication Data
US 2019/0134461 A1 May 9, 2019

(30) Foreign Application Priority Data
Apr. 14, 2016 (JP) .............................. JP2016-081073

(51) Int. Cl.
*A63B 24/00* (2006.01)
*A63B 69/00* (2006.01)
(Continued)

(52) U.S. Cl.
CPC .......... *A63B 24/0003* (2013.01); *A63B 69/00* (2013.01); *A63B 71/06* (2013.01);
(Continued)

(58) Field of Classification Search
CPC ..... A63B 24/0003; A63B 69/00; A63B 71/06; G01P 7/00; G01P 1/07; G01P 3/00; G01P 15/18
See application file for complete search history.

(56) References Cited

U.S. PATENT DOCUMENTS 5,511,789 A 4/1996 Nakamura
6,899,633 B1 5/2005 Kienzle
(Continued)

FOREIGN PATENT DOCUMENTS

JP 06-165845 6/1994
JP H06-165845 A 6/1994
(Continued)

OTHER PUBLICATIONS

International Search Report and Written Opinion issued in connection with International Patent Application No. PCT/JP2017/012807, dated Jun. 20, 2017. (11 pages).

*Primary Examiner* — Tarun Sinha
*Assistant Examiner* — Lal C Mang
(74) *Attorney, Agent, or Firm* — K&L Gates LLP

(57) ABSTRACT

A motion measurement apparatus according to an embodiment of the present technology includes a detector unit, a controller unit, and an output unit. The detector unit is to be attached to a detection target and detects velocity-related information, the velocity-related information being related to temporal changes in velocities in three-axis directions of the detection target being in motion in a space. The controller unit extracts a motion feature amount including one or a plurality of kinematic physical quantities of the detection target on the basis of the velocity-related information. The output unit generates a perceivable measurement signal that changes depending on the motion feature amount.

13 Claims, 23 Drawing Sheets

(51) Int. Cl.
*A63B 71/06* (2006.01)
*G01P 7/00* (2006.01)
*G01P 1/07* (2006.01)
*G01P 3/00* (2006.01)
*G01P 15/18* (2013.01)

(52) U.S. Cl.
CPC .................. *G01P 1/07* (2013.01); *G01P 3/00* (2013.01); *G01P 7/00* (2013.01); *G01P 15/18* (2013.01)

(56) References Cited

U.S. PATENT DOCUMENTS

| | | | |
|---|---|---|---|
| 2002/0020217 A1 | 2/2002 | Imatoh | |
| 2006/0215853 A1* | 9/2006 | Hiruma | H04S 7/30 381/97 |
| 2007/0207873 A1* | 9/2007 | Rose | A63B 24/0006 473/207 |
| 2011/0230274 A1* | 9/2011 | Lafortune | A63B 24/0003 473/217 |
| 2013/0113396 A1 | 5/2013 | Uehara | |

FOREIGN PATENT DOCUMENTS

| | | |
|---|---|---|
| JP | 2001-218881 | 8/2001 |
| JP | 2001-218881 A | 8/2001 |
| JP | 2002-203401 | 7/2002 |
| JP | 2002-203401 A | 7/2002 |
| JP | 2013-040991 | 2/2013 |
| JP | 2013-040991 A | 2/2013 |
| JP | 2015-057193 | 3/2015 |
| JP | 2015-188681 A | 11/2015 |
| WO | 94/19070 | 9/1994 |
| WO | 94/019070 A1 | 9/1994 |

\* cited by examiner

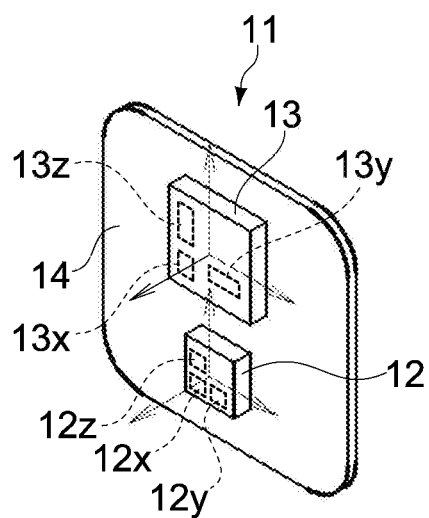
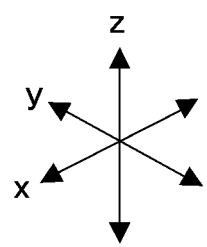
FIG.3

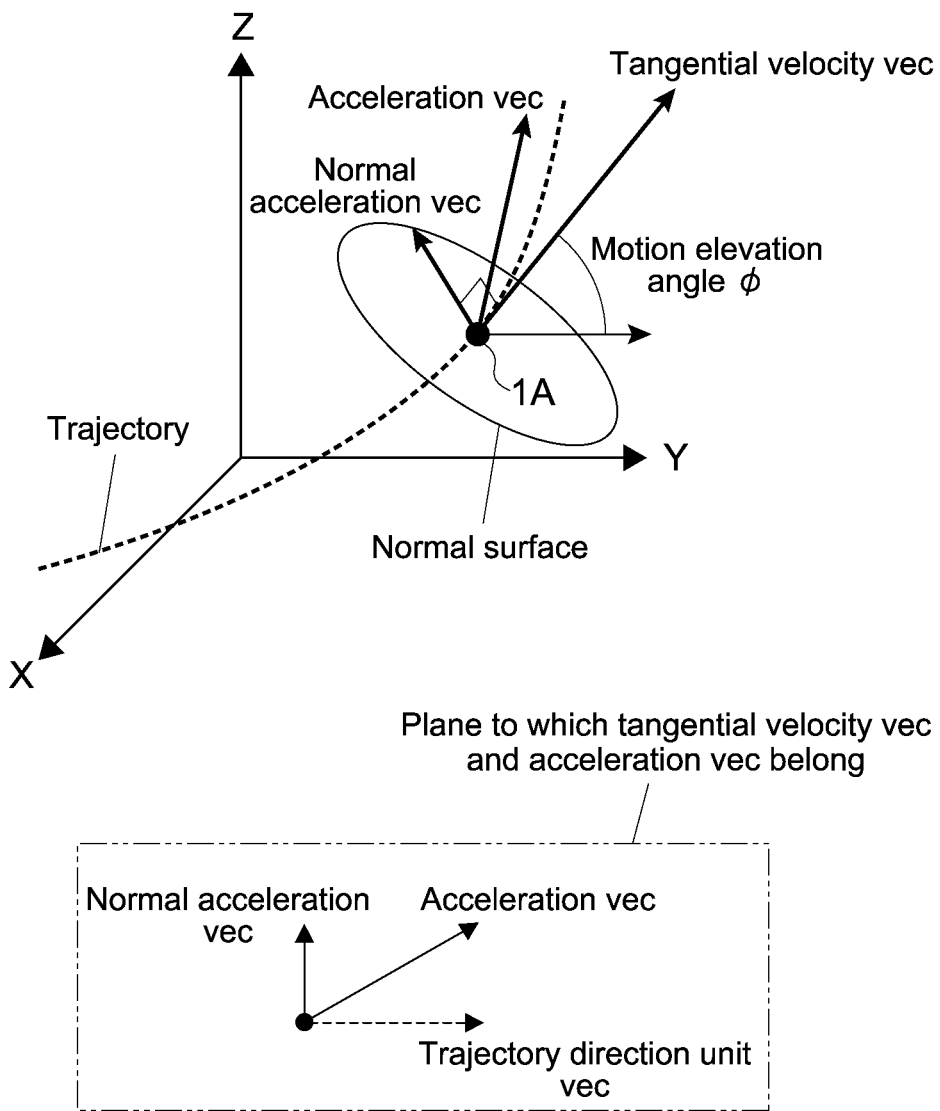

Trajectory direction unit vec = Tangential velocity vec / |Tangential velocity vec|

··· (1)

Normal acceleration vec
= Acceleration vec -
  (Acceleration vec·Trajectory direction unit vec)Trajectory direction unit vec
= Acceleration vec -
  (Acceleration vec·Tangential velocity vec)Velocity vec / |Tangential velocity vec|

··· (2)

Motion elevation angle $\phi$ = $\tan^{-1} V_Z / \sqrt{(V_X^2 + V_Y^2)}$ ··· (3)

FIG.10

Sensor tangential velocity: $v_t = 6\pi(-t^2 + t)$ ...(4)

Movement distance: $L = \int_0^1 v_t dt = \int_0^1 6\pi(-t^2 + t)dt = \pi$ ...(5)

Sensor angular velocity: $\omega = -\dfrac{v_t}{r} = -6\pi(-t^2 + t)$ ...(6)

Sensor tangential acceleration: $a_t = \dfrac{dv_t}{dt} = 6\pi(-2t + 1)$ ...(7)

Sensor normal acceleration: $a_n = \dfrac{v_t^2}{r} = 36\pi^2(-t^2 + t)^2$ ...(8)

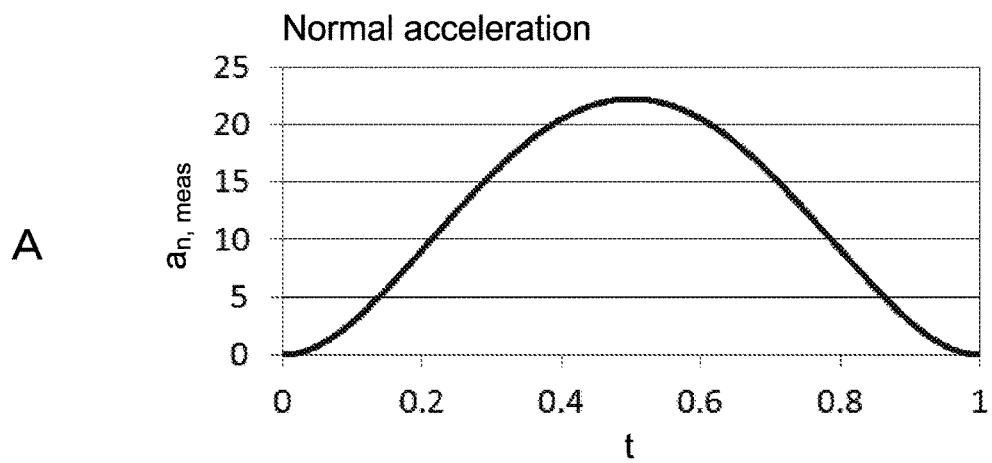
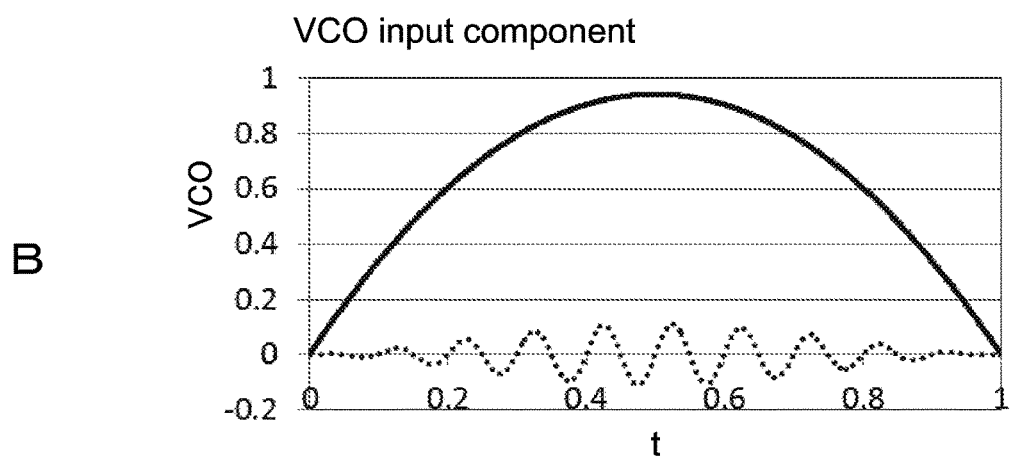
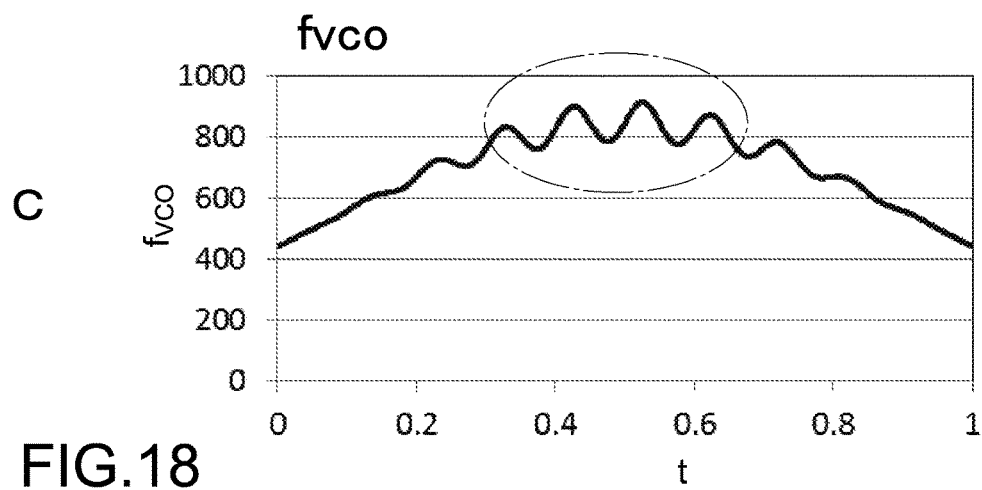
FIG.18

MOTION MEASUREMENT APPARATUS, INFORMATION PROCESSING APPARATUS, AND MOTION MEASURING METHOD

CROSS-REFERENCE TO RELATED APPLICATIONS

The present application claims the benefit of International Application No. PCT/JP2017/012807, filed Mar. 29, 2017, which claims priority to Japanese Application No. 2016-081073, filed Apr. 14, 2016, the disclosures of which are incorporated herein by reference.

BACKGROUND

The present technology relates to a motion measurement apparatus, an information processing apparatus, and a motion measuring method for measuring an operation of a body of a user, for example.

In recent years, in the fields of sports science, human science, and the like, an apparatus that analyzes the motion of a human or an object has been developed. As this type of apparatus, there are known an inertial sensor type that measures a motion from an output of an acceleration sensor, a gyro sensor, or the like attached to a detection target, an optical type that images a plurality of markers attached to a detection target with a camera and processes the camera image to measure a motion, and the like.

For example, Patent Literature 1 discloses a swing analysis device that calculates swing feature information on the basis of output data of a sensor unit that detects a swing of a golf club or the like, compares this swing feature information with reference swing feature information, and displays a result of the comparison on a display unit or outputs a result of the comparison by sound, a sound message, music, or the like.

SUMMARY

Technical Problem

However, since the swing analysis device described in Patent Literature 1 calculates the swing feature information from the whole of the series of operations from the start of a swing to the end thereof, it is difficult to intuitively grasp whether a posture or a trajectory of the club that changes moment by moment in the course of a swing operation is good or bad.

In view of the circumstances as described above, it is an object of the present technology to provide a motion measurement apparatus, an information processing apparatus, and a motion measuring method that are capable of more intuitively grasping a moving posture or a trajectory of a detection target.

Solution to Problem

A motion measurement apparatus according to an embodiment of the present technology includes a detector unit, a controller unit, and an output unit.

The detector unit is to be attached to a detection target and detects velocity-related information, the velocity-related information being related to temporal changes in velocities in three-axis directions of the detection target being in motion in a space.

The controller unit extracts a motion feature amount including one or a plurality of kinematic physical quantities of the detection target on the basis of the velocity-related information.

The output unit generates a perceivable measurement signal, the perceivable measurement signal changing depending on the motion feature amount.

In the motion measurement apparatus, the output unit is configured to generate the perceivable measurement signal that changes depending on the motion feature amount of the detection target, and thus a user can more intuitively grasp a moving posture or a trajectory of the detection target.

Here, the perceivable measurement signal implies various signals recognizable by the user through the senses of hearing, sight, touch, and the like. Typically, the perceivable measurement signal includes a sound wave, light, vibration, and the like.

The controller unit may be configured to extract a first kinematic physical quantity and a second kinematic physical quantity as the motion feature amount and generate a modulation signal obtained by modulating a first measurement signal corresponding to the first kinematic physical quantity by a second measurement signal corresponding to the second kinematic physical quantity. In this case, the output unit generates the measurement signal on the basis of the modulation signal.

With this configuration, the motion of the detection target that is based on the plurality of kinematic physical quantities can be intuitively presented to the user.

The controller unit may include an arithmetic unit that extracts the motion feature amount, and a modulator unit that generates the modulation signal.

The first and second kinematic physical quantities are not particularly limited. For example, the controller unit may be configured to extract a tangential velocity of the detection target as the first kinematic physical quantity. Further, the controller unit may be configured to extract at least one of an acceleration, a normal acceleration, and a motion elevation angle of the detection target as the second kinematic physical quantity.

The configuration of the output unit is not particularly limited. For example, the output unit may include a sound-emitting element or a light-emitting element. In this case, a sound wave whose scale, tone, volume, or the like changes depending on the motion feature amount, or light whose color, intensity, light-emission pattern, or the like changes depending on the motion feature amount is generated as the measurement signal.

The configuration of the detector unit is not also particularly limited. For example, the detector unit may include an acceleration sensor unit that detects accelerations in the three-axis directions. In addition thereto, the detector unit may include an angular velocity sensor unit that detects angular velocities about the three axes.

An information processing apparatus according to an embodiment of the present technology includes a controller unit.

The controller unit extracts a motion feature amount including one or a plurality of kinematic physical quantities of a detection target being in motion in a space on the basis of velocity-related information, the velocity-related information being related to temporal changes in velocities in three-axis directions of the detection target, and generates a control signal for controlling an output unit capable of generating a perceivable measurement signal, the perceivable measurement signal changing depending on the motion feature amount.

The information processing apparatus may further include a detector unit that acquires the velocity-related information.

An information processing apparatus according to another embodiment of the present technology includes a controller unit and an output unit.

The controller unit extracts a motion feature amount including one or a plurality of kinematic physical quantities of a detection target being in motion in a space on the basis of velocity-related information, the velocity-related information being related to temporal changes in velocities in three-axis directions of the detection target.

The output unit generates a perceivable measurement signal, the perceivable measurement signal changing depending on the motion feature amount.

A motion measuring method according to an embodiment of the present technology includes acquiring velocity-related information, the velocity-related information being related to temporal changes in velocities in three-axis directions of a detection target being in motion in a space.

On the basis of the velocity-related information, a motion feature amount including one or a plurality of kinematic physical quantities of the detection target is extracted.

A perceivable measurement signal that changes depending on the motion feature amount is generated.

Advantageous Effects of Invention

As described above, according to the present technology, it is possible to more intuitively grasp a moving posture or a trajectory of a detection target. It should be noted that the effects described herein are not necessarily limited, and any of the effects described in the present disclosure may be produced.

BRIEF DESCRIPTION OF DRAWINGS

FIG. 3 is a schematic perspective view showing a configuration of a detector unit in the motion measurement apparatus.

FIG. 10 is a diagram for describing a method of calculating a normal acceleration and a motion elevation angle.

FIGS. 18A, 18B, and 18C are diagrams for describing an action of the motion measurement apparatus.

DETAILED DESCRIPTION

Hereinafter, embodiments according to the present technology will be described with reference to the drawings.

First Embodiment

[General Outline of Apparatus]

Figure 1:
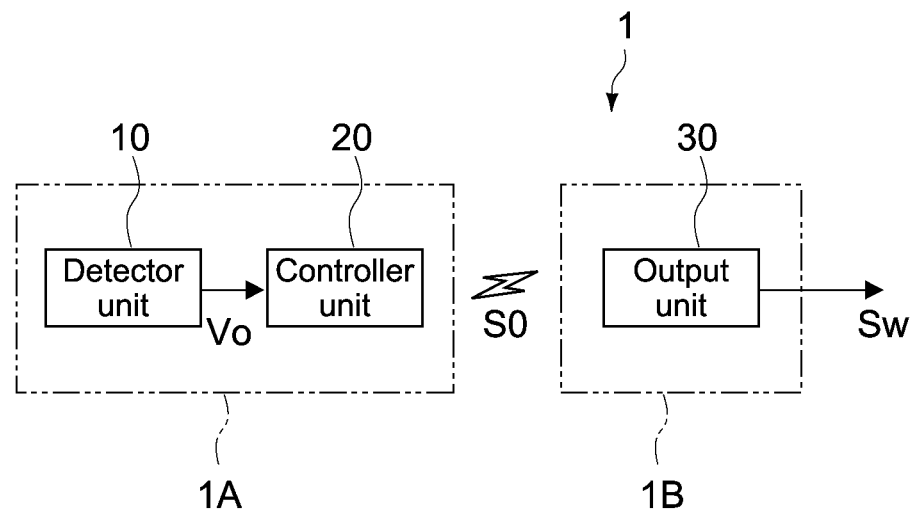
FIG. 1 is a block diagram showing a schematic configuration of a motion measurement apparatus according to an embodiment of the present technology.
Figure 2:
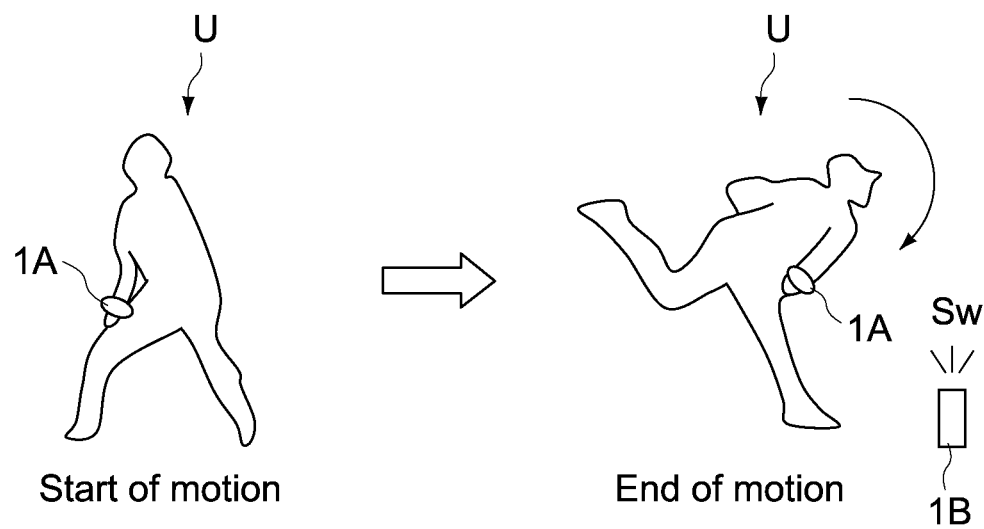
FIG. 2 is a schematic view for describing an application example of the motion measurement apparatus.

FIG. 1 is a block diagram showing a schematic configuration of a motion measurement apparatus according to an embodiment of the present technology. FIG. 2 is a schematic view for describing an application example of the motion measurement apparatus.

As shown in FIG. 1, a motion measurement apparatus 1 of this embodiment includes a detector unit 10, a controller unit 20, and an output unit 30. The motion measurement apparatus 1 is configured to measure various kinematic physical quantities of a detection target in a space and output a perceivable signal such as sound or light that differs on the basis of a result of the measurement. In particular, the motion measurement apparatus 1 of this embodiment includes a sensor device 1A and a terminal device 1B, the sensor device 1A including the detector unit 10 and the controller unit 20, the terminal device 1B including the output unit 30.

The sensor device 1A is configured to be mountable to a detection target part of a user U. The terminal device 1B is configured to be communicable with the sensor device 1A wirelessly or wiredly and is typically constituted of a portable information terminal such as a smartphone, a mobile phone, or a laptop PC (personal computer).

In this embodiment, for example, as shown in FIG. 2, the sensor device 1A is mounted to an arm of the user U who practices pitching, the arm carrying a ball. The sensor device 1A is configured to extract kinematic physical quantities from the start of a motion (start of pitching) to the end of the operation (end of pitching) of the user U at each predetermined time or continuously and transmits the kinematic physical quantities to the terminal device 1B. The terminal device 1B is configured to notify the user U of information corresponding to the measurement result acquired from the kinematic physical quantities described above, such as a tangential velocity or a normal acceleration of the arm, as a perceivable measurement signal Sw such as sound or light.

The detector unit 10 includes a casing (not shown in the figure) including a mounting tool attachable to the user U, such as a band or a hook, and a sensor module (see FIG. 3) housed in the casing. The detector unit 10 detects velocity-related information Vo that is related to temporal changes in velocities in directions of three orthogonal axes (in FIG. 2, X, Y, and Z axes) on real space coordinates of the user U exercising in a space (hereinafter, also referred to as global coordinate system).

The user U as a detection target includes not only the user but also an exercise tool used by the user. In a case where the detection target is the user, more specifically, a part of a body to which the sensor device 1A is to be attached (e.g., arm, leg, head part, or lumbar part) corresponds to the detection target. The sensor device 1A is not limited to the case where the sensor device 1A is directly attached to the body of the user, but may be attached to a part which is integrally moves with the user, such as clothing, a hat, a shoe, a glove, a wristband, or a belt.

Meanwhile, examples of the exercise tool include sports-specific tools such as a club, a bat, a racket, and a baton used by a user in the user's hand.

FIG. 3 is a schematic perspective view showing a configuration of the detector unit 10.

The detector unit 10 includes an inertial sensor module 11 including an acceleration sensor unit 12 that detects accelerations in directions of three orthogonal axes (in FIG. 3, x, y, and z axes) in a local coordinate system. As shown in FIG. 3, the detector unit 10 may further include an angular velocity sensor unit 13 that detects angular velocities about the three axes. The detector unit 10 provides outputs of the acceleration sensor unit 12 and the angular velocity sensor unit 13, as the velocity-related information Vo of the detection target, to the controller unit 20 in predetermined sampling periods (e.g., 0.1 to 1 msec). When the sampling period is set to 0.1 msec or more, a distance resolution of approximately 1 cm can be obtained with respect to the detection target that moves at 200 km/h, for example. Further, when the sampling period is set to 1 msec or less, it is generally applicable to a practical use.

The acceleration sensor unit 12 includes acceleration sensors 12x, 12y, and 12z that respectively detect accelerations in the x-, y-, and z-axis directions (hereinafter, also referred to as acceleration components in local coordinate system). For the acceleration sensors 12x to 12z, any type of sensors such as a piezoresistive type, a piezoelectric type, a capacitance type, and an electromagnetic induction type may be used.

The angular velocity sensor unit 13 includes angular velocity sensors 13x, 13y, and 13z that respectively detect angular velocities about the x, y, and z axes (hereinafter, also referred to as angular velocity components in local coordinate system). For the angular velocity sensors 13x to 13z, a vibration type gyro sensor is typically used. In addition thereto, a rotary top gyro sensor, a laser ring gyro sensor, a gas rate gyro sensor, and the like may be used.

It should be noted that, in the example of the figure, the acceleration sensors 12x to 12z and the angular velocity sensors 13x to 13z of the respective axes are individually configured, but the present technology is not limited thereto. The acceleration sensor 12 and the angular velocity sensor 13 may each include a single sensor that can simultaneously detect accelerations or angular velocities in two-axis directions or three-axis directions.

A circuit substrate 14 supports the acceleration sensor unit 12 and the angular velocity sensor unit 13 in common. The present technology is not limited thereto, and the circuit substrate 14 may be constituted of substrates different from each other for the sensor units 12 and 13. Further, even though not shown in the figure, a driver circuit that drives the sensor units 12 and 13, and a signal processing circuit that processes outputs of those sensor units 12 and 13 may be mounted to the circuit substrate 14.

Examples of the signal processing circuit include an integration circuit for obtaining velocity information from the acceleration sensor unit 12, an angle calculation circuit for obtaining angle information (rotational angle components) from the angular velocity sensor unit 13, a filter circuit for removing a gravity component, a coordinate conversion circuit that converts an xyz coordinate system into an XYZ coordinate system, and a controller that controls those circuits. It should be noted that part or all of those signal processing circuits may be provided to the controller unit 20.

The controller unit 20 extracts a motion feature amount including one or a plurality of kinematic physical quantities of the user U on the basis of the velocity-related information Vo output from the detector unit 10.

The kinematic physical quantity typically implies a physical quantity such as a velocity or an angular velocity, or a time differential value thereof (acceleration, angular velocity, etc.) or a time integration value thereof (distance, angle, etc.). Further, the kinematic physical quantity includes various physical quantities (tangential velocity, tangential acceleration, normal acceleration, motion elevation angle, etc.) calculated from the physical quantities described above.

The controller unit 20 is configured as an information processing apparatus that calculates one or a plurality of kinematic physical quantities from the velocity-related information Vo output from the detector unit 10 and generates a control signal S0 for controlling the output unit 30 on the basis of a calculation result. The control signal S0 is a signal that changes over time depending on the motion feature amount that changes moment by moment. The control signal S0 may be a signal that changes depending on the magnitude of a single kinematic physical quantity (e.g., tangential velocity) or may be a signal obtained by modulating a frequency, an intensity, a waveform, or the like of the above-mentioned kinematic physical quantity by another kinematic physical quantity (e.g., normal acceleration or elevation angle). The control signal S0 generated in the controller unit 20 is transmitted to the output unit 30.

The output unit 30 is configured to output a perceivable measurement signal Sw that changes depending on the motion feature amount of the user U on the basis of the control signal S0. In other words, the measurement signal Sw includes various signals recognizable by the user through the senses of hearing, sight, touch, and the like. Typically, examples of the measurement signal Sw include a sound wave in an audible range, visible light, vibration, and a combination of two or more of them. To output such a measurement signal Sw, the output unit 30 includes a sound-emitting element such as a speaker or a buzzer, a light-emitting element such as an LED (Light-Emitting Diode), or a vibration-generating element such as a vibration motor.

The control signal S0 generated in the controller unit 20 controls the drive of the output unit 30 so as to change the measurement signal Sw depending on the motion feature amount that changes moment by moment. Specifically, in a case where the measurement signal Sw is a sound wave, the output unit 30 changes a scale, a tone, a volume, and the like depending on the motion feature amount, and in a case where the measurement signal Sw is light, the output unit 30 changes a color (wavelength), an intensity, a light-emission pattern, or the like depending on the motion feature amount. Furthermore, in a case where the measurement signal Sw is vibration, the output unit 30 changes a magnitude, a direction, an oscillation pattern, and the like depending on the motion feature amount.

Typically, the motion feature amount changes moment by moment in the course of a series of operations from the start of a motion to the end of the motion of the user U. For that reason, the measurement signal Sw to be output in the output unit 30 is not constant, and an output mode thereof changes continuously or intermittently. Therefore, by perceiving this measurement signal Sw, the user U can more intuitively grasp a change in throwing velocity or throwing form (pitching form), or the like in the pitching practice shown in FIG. 2, for example.

Hereinafter, the motion measurement apparatus 1 according to this embodiment will be described in detail.

[Basic Configuration]

Figure 4:
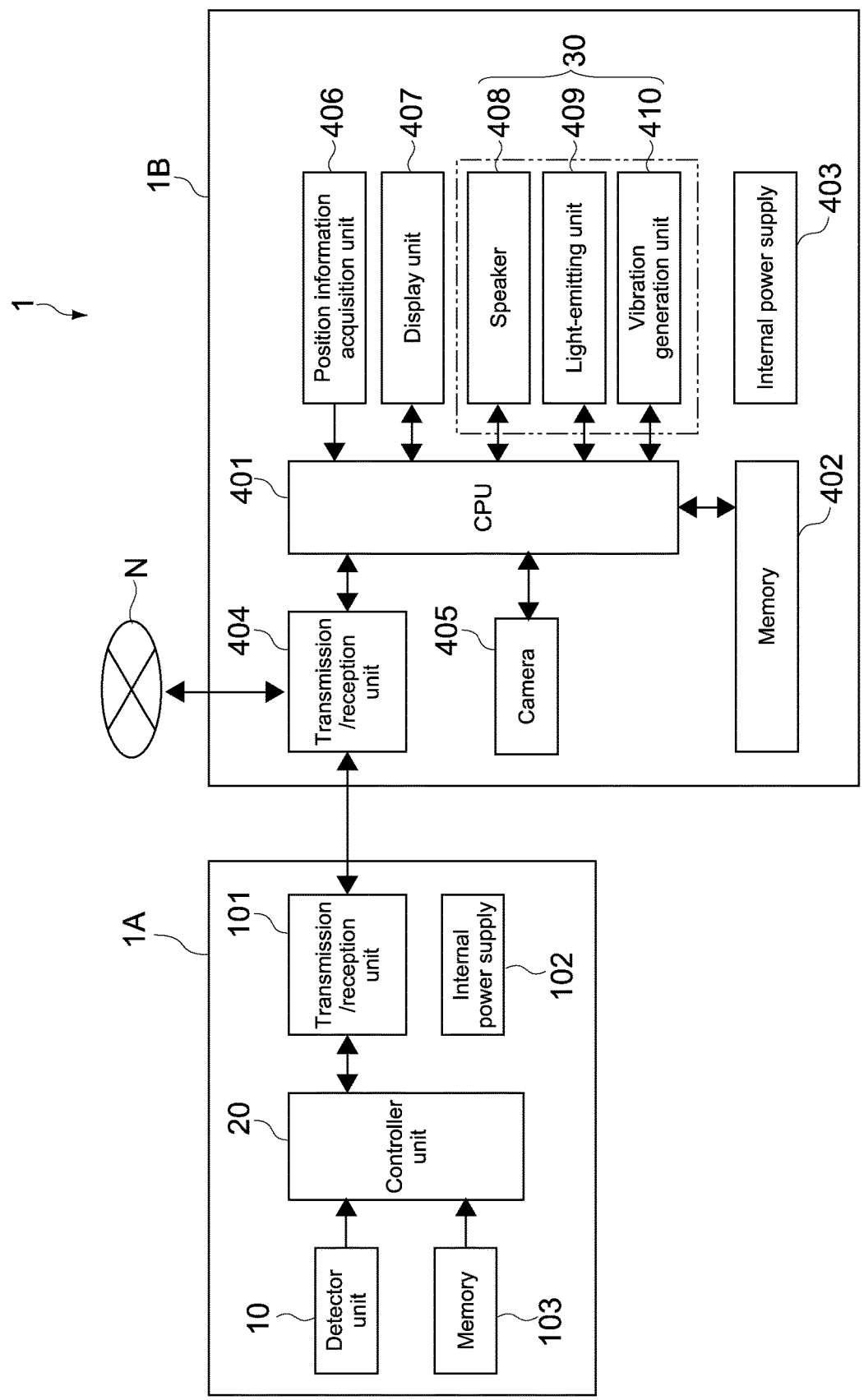
FIG. 4 is a system configuration diagram of the motion measurement apparatus.
Figure 5:
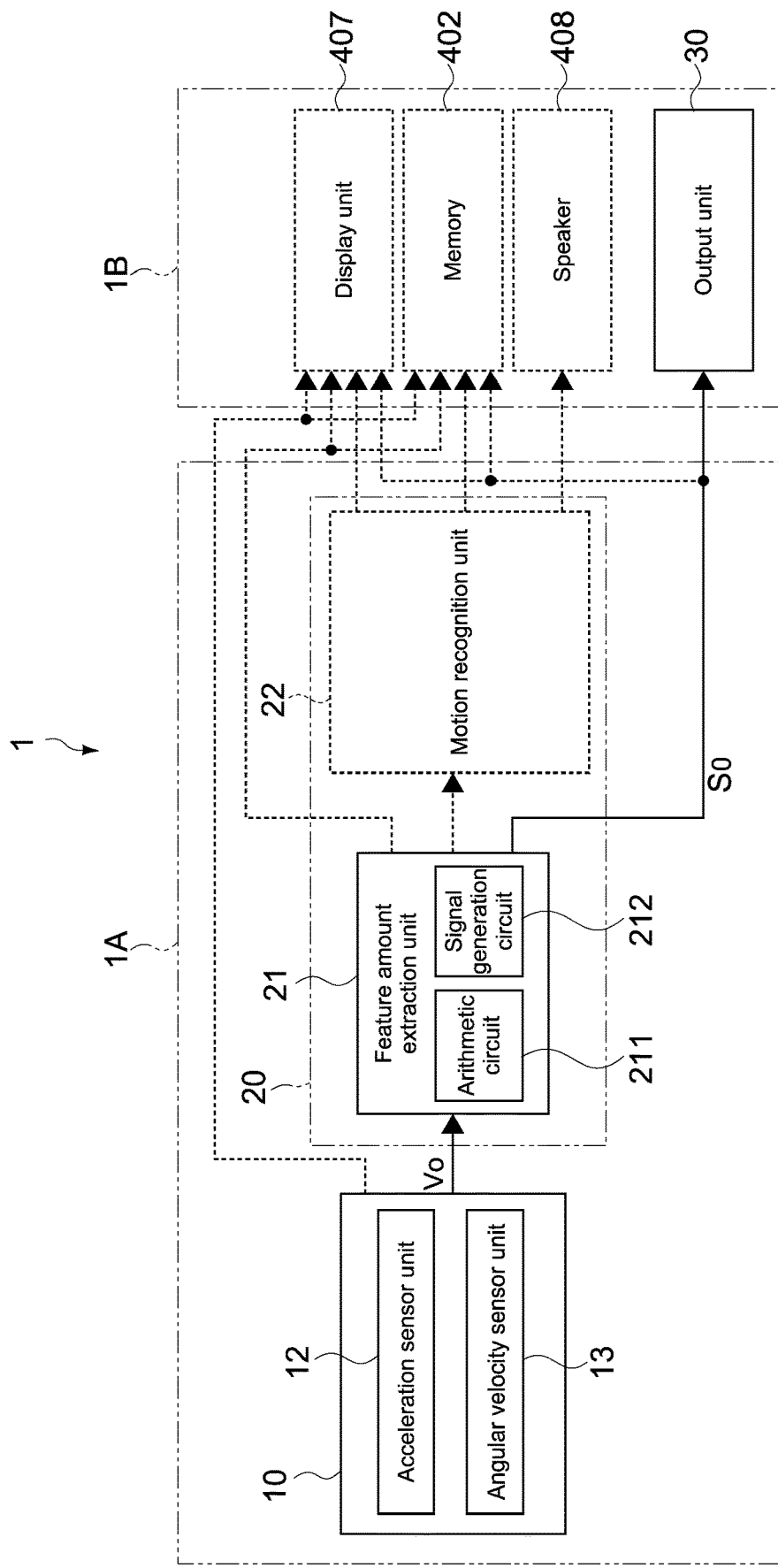
FIG. 5 is a block diagram showing a basic configuration of a main part of the motion measurement apparatus.

FIG. 4 is a system configuration diagram of the motion measurement apparatus 1, and FIG. 5 is a block diagram showing a basic configuration of a main part thereof. The motion measurement apparatus 1 configures a measurement system including the sensor device 1A and the terminal device 1B.

(Sensor Device)

A sensor device 1A includes the detector unit 10, the controller unit 20, a transmission/reception unit 101, an internal power supply 102, a memory 103, and a power supply switch (not shown in the figure).

The detector unit 10 includes the inertial sensor module 11 including the acceleration sensor unit 12 and the angular velocity sensor unit 13 (see FIG. 3). The detector unit 10 sequentially outputs the acceleration components and angular velocity components in the local coordinate system that are acquired in the predetermined sampling periods, as the velocity-related information Vo of the user U (sensor device 1A), to the controller unit 20.

The controller unit 20 is constituted of an arithmetic device such as a computer including a CPU (Central Processing Unit) and an internal memory. The controller unit 20 controls an operation of the sensor device 1A. The controller unit 20 may be constituted of an analog circuit. The controller unit 20 mainly extracts the motion feature amount including one or a plurality of kinematic physical quantities of the user U (sensor device 1A) on the basis of the velocity-related information Vo, and generates the control signal S0 corresponding to that motion feature amount.

The transmission/reception unit 101 includes a communication circuit and an antenna, for example, and constitutes an interface for communicating with the terminal device 1B (transmission/reception unit 404). The transmission/reception unit 101 is configured to be capable of transmitting an output signal including the control signal S0 generated in the controller unit 20 to the terminal device 1B. Further, the transmission/reception unit 101 is configured to be capable of receiving setting information of the controller unit 20, which is transmitted from the terminal device 1B, and the like.

The communication performed between the transmission/reception unit 101 and the transmission/reception unit 201 may be wireless or wired. The wireless communication may be communication using an electromagnetic wave (including infrared rays) or communication using an electric field. For a specific method, a communication method using a band ranging from several hundreds of MHz (megahertz) to several GHz (gigahertz), such as "Wi-Fi (registered trademark)", "Zigbee (registered trademark)", "Bluetooth (registered trademark)", "Bluetooth Low Energy", "ANT (registered trademark)", "ANT+(registered trademark)", or "EnOcean (registered trademark)", can be exemplified. Proximity wireless communication such as NFC (Near Field Communication) may also be used.

The internal power supply 102 supplies power necessary to drive the sensor device 1A. For the internal power supply 102, a power storage element such as a primary battery or a secondary battery may be used. Alternatively, an energy harvesting technique including a power-generating element for vibration power generation, solar power generation, or the like and parasitic means may be used. In particular, in this embodiment, since the detection target having a motion is a measurement target, an energy harvesting device such as a vibration power generation device is suitable for the internal power supply 102.

The memory 104 includes a ROM (Read Only Memory), a RAM (Random Access Memory), and the like and stores programs for executing control of the sensor device 1A by the controller unit 20, such as a program for generating the control signal S0 from the velocity-related information Vo, various parameters, or data.

(Terminal Device)

The terminal device 1B is typically constituted of a portable information terminal and includes a CPU 401, a memory 402, an internal power supply 403, a transmission/reception unit 404, a camera 405, a position information acquisition unit (GPS (Global Positioning System) device) 406, a display unit 407, a speaker 408, a light-emitting unit 409, and a vibration generation unit 410.

The CPU 401 controls the entire operation of the terminal device 1B. The memory 402 includes a ROM, a RAM, and the like and stores programs for executing control of the terminal device 1B by the CPU 401, various parameters, or data. The internal power supply 403 is for supplying power necessary to drive the terminal device 1B and is typically constituted of a chargeable/dischargeable secondary battery.

The transmission/reception unit 404 includes a communication circuit capable of communicating with the transmission/reception unit 101 and an antenna. The transmission/reception unit 404 is further configured to be capable of communicating with another portable information terminal, a server, and the like by using wireless LAN or a 3G or 4G network N for mobile communication.

The display unit 407 is constituted of, for example, an LCD (Liquid Crystal Display) or an OLED (Organic Light Emitting Diode) and displays various menus, GUIs (Graphic User Interface) of applications, or the like. Typically, the display unit 407 includes a touch sensor and is configured to be capable of inputting predetermined setting information to the sensor device 1A via the CPU 401 and the transmission/reception unit 404 by a touch operation of the user.

The output unit 30 is driven on the basis of the control signal S0 from the sensor device 1A, which is received via the transmission/reception unit 404, and generates the measurement signal Sw perceivable for the user U. The output unit 30 may be constituted of at least one of the speaker 408, the light-emitting unit 409, the vibration generation unit 410, and the like incorporated in the terminal device 1B.

In this embodiment, the output unit 30 is constituted of a speaker. The output unit 30 may be constituted of the speaker 408 or may be constituted of a speaker different from the speaker 408. In the following description, a case where the output unit 30 is constituted of a speaker different from the speaker 408 will be exemplified.

[Basic Configuration of Controller Unit]

Subsequently, details of the controller unit 20 in the sensor device 1A will be described. FIG. 5 is a block diagram showing a basic configuration of the controller unit 20.

As shown in FIG. 5, the controller unit 20 includes a feature amount extraction unit 21 and a motion recognition unit 22.

The feature amount extraction unit 21 calculates a predetermined kinematic physical quantity of the user U (sensor device 1A) on the basis of the velocity-related information Vo to thus extract a motion feature amount, and generates a control signal S0 corresponding to the motion feature amount.

The motion recognition unit 22 is for extracting the presence/absence of a particular motion pattern or the like on the basis of the predetermined kinematic physical quantity described above, transmitting that output to the terminal device 1B, and displaying or recording that measurement result on the display unit 407 or in the memory 402. It should be noted that the implementation of the motion recognition unit 22 is arbitrary and may be omitted depending on the specifications or the like.

The feature amount extraction unit 21 includes an arithmetic circuit 211 and a signal generation circuit 212.

(Arithmetic Circuit)

The arithmetic circuit 211 is configured as an arithmetic unit that extracts one or a plurality of motion feature amounts on the basis of the velocity-related information Vo. The arithmetic circuit 211 calculates, as predetermined motion feature amounts, a plurality of motion feature amounts such as a tangential velocity ($v_t$), a tangential acceleration ($a_t$), a normal acceleration ($a_n$), an elevation angle ($v_\theta$), and the like.

Configuration Example 1 of Arithmetic Circuit

Figure 6:
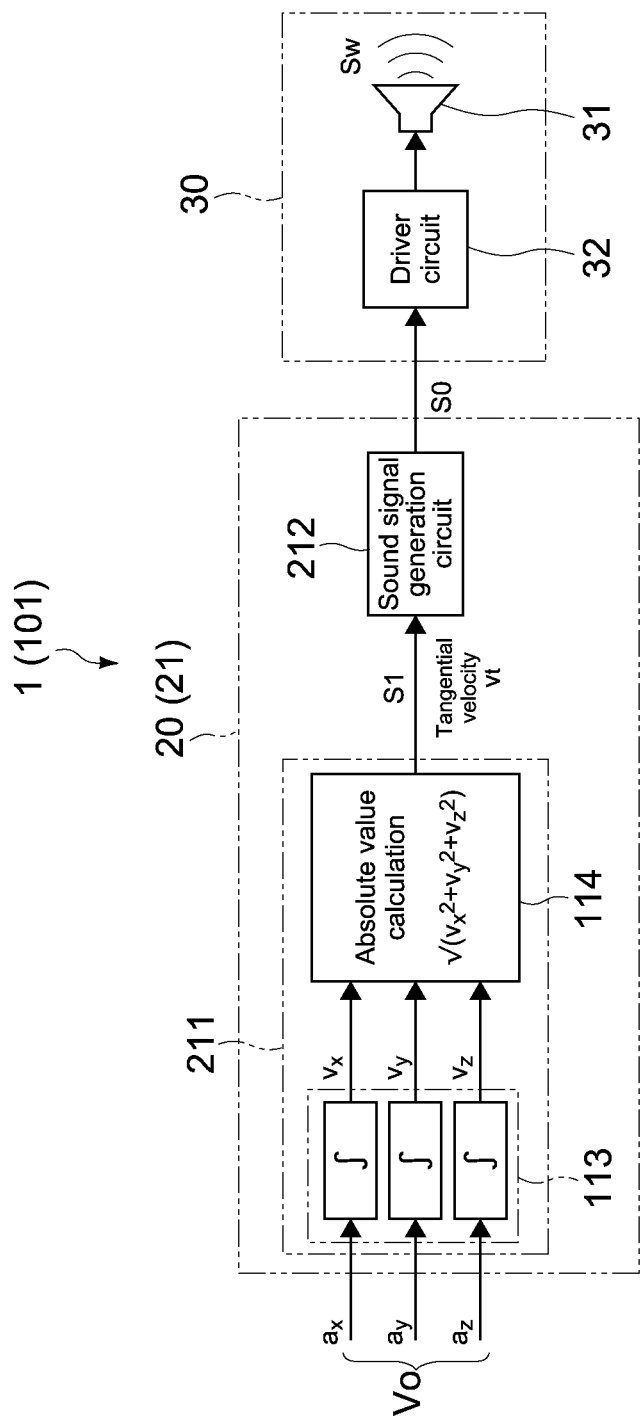
FIG. 6 is a block diagram showing a configuration example of an arithmetic circuit in the motion measurement apparatus.

FIG. 6 is a block diagram of a motion measurement system 101 showing a configuration example of the arithmetic circuit 211.

The arithmetic circuit 211 includes an integrator 113 and an absolute value calculation circuit 114. In this configuration example, the output signal of the acceleration sensor unit 12 is used as the velocity-related information Vo.

The integrator 113 performs time integration on the acceleration components ($a_x$, $a_y$, $a_z$) in the local coordinate system for the respective axes, and thus extracts velocity components ($v_X$, $v_Y$, $v_Z$). The absolute value calculation circuit 114 calculates an absolute value ($\sqrt{(v_x^2+v_y^2+v_z^2)}$) of the velocity components ($v_X$, $v_Y$, $v_Z$), and thus obtains a tangential velocity ($v_t$). The calculated tangential velocity ($v_t$) is output, as a first measurement signal S1, to the signal generation circuit 212.

In the example described above, the acceleration components ($a_g$, $a_y$, $a_z$) of the local components are used as the output of the acceleration sensor unit 12 that is to be input to the integrator 113, but those acceleration components ($a_g$, $a_y$, $a_z$) may be considered as acceleration components ($a_X$, $a_Y$, $a_Z$) of global components to calculate an absolute value ($\sqrt{/(v_x^2+v_y^2+v_z^2)}$). Alternatively, acceleration components in the global coordinate system may be extracted by referring to the acceleration components of the respective axes at the time the user U starts a motion, for example.

The output unit 30 includes a sound-emitting element 31 and a driver circuit 32. The driver circuit 32 drives the sound-emitting element 31 on the basis of the control signal S0 and generates a sound wave as the measurement signal Sw from the sound-emitting element 31. Examples of an oscillation element 31 include a diaphragm, and examples of the driver circuit 32 include a voice coil motor (VCM).

Configuration Example 2 of Arithmetic Circuit

Figure 7:
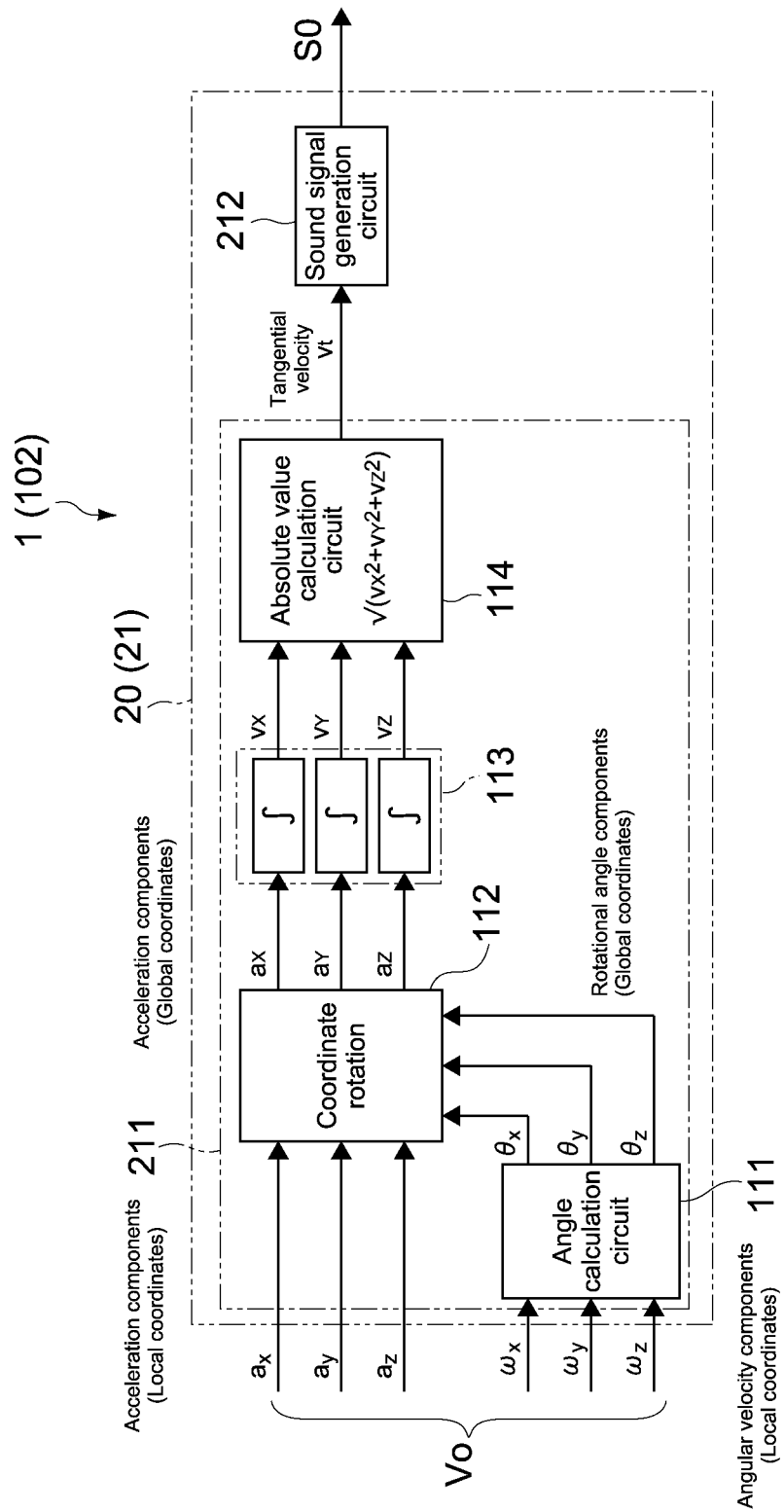
FIG. 7 is a block diagram showing a configuration example of the arithmetic circuit in the motion measurement apparatus.

FIG. 7 is a block diagram of a motion measurement system 102 showing another configuration example of the arithmetic circuit 211. It should be noted that, in FIG. 7, portions corresponding to those of FIG. 6 will be denoted by the same reference signs, and description thereof will be omitted.

The arithmetic circuit 211 further includes an angle calculation circuit 111 and a coordinate rotation circuit 112. In this configuration example, the output signals of the acceleration sensor unit 12 and the angular velocity sensor unit 13 are used as the velocity-related information Vo.

The angle calculation circuit 111 calculates rotational angle components ($\theta_x$, $\theta_y$, $\theta_z$) from the angular velocity components ($\omega_x$, $\omega_y$, $\omega_z$) in the local coordinate system that are output from the angular velocity sensor unit 13, and then outputs the rotational angle components ($\theta_x$, $\theta_y$, $\theta_z$) to the coordinate rotation circuit 112. On the basis of the above-mentioned rotational angle components ($\theta_x$, $\theta_y$, $\theta_z$), the coordinate rotation circuit 112 calculates the acceleration components ($a_X$, $a_Y$, $a_Z$) in the global coordinate system from the acceleration components ($a_x$, $a_y$, $a_z$) in the local coordinate system that are output from the acceleration sensor unit 12. The integrator 113 performs time integration on the acceleration components ($a_X$, $a_Y$, $a_Z$) in the global coordinate system for the respective axes, and thus extracts velocity components ($v_X$, $v_Y$, $v_Z$). The absolute value calculation circuit 114 calculates an absolute value ($\sqrt{(v_x^2+v_y^2+v_z^2)}$) of the velocity components ($v_X$, $v_Y$, $v_Z$), and thus obtains a tangential velocity ($v_t$).

In the angle calculation circuit 111, a posture calculation technique generally used in the field of inertial navigation is employed. The coordinate rotation circuit 112 converts the acceleration components ($a_x$, $a_y$, $a_z$) in the local coordinate system into the acceleration components ($a_X$, $a_Y$, $a_Z$) in the global coordinate system on the basis of the rotational angle components calculated in the angle calculation circuit 111. According to this configuration example, the velocity components ($v_X$, $v_Y$, $v_Z$) of the respective axes are calculated by compensating for rotational components about the respective axes, so that the tangential velocity ($v_t$) can be calculated with higher accuracy.

Configuration Example 3 of Arithmetic Circuit

Figure 8:
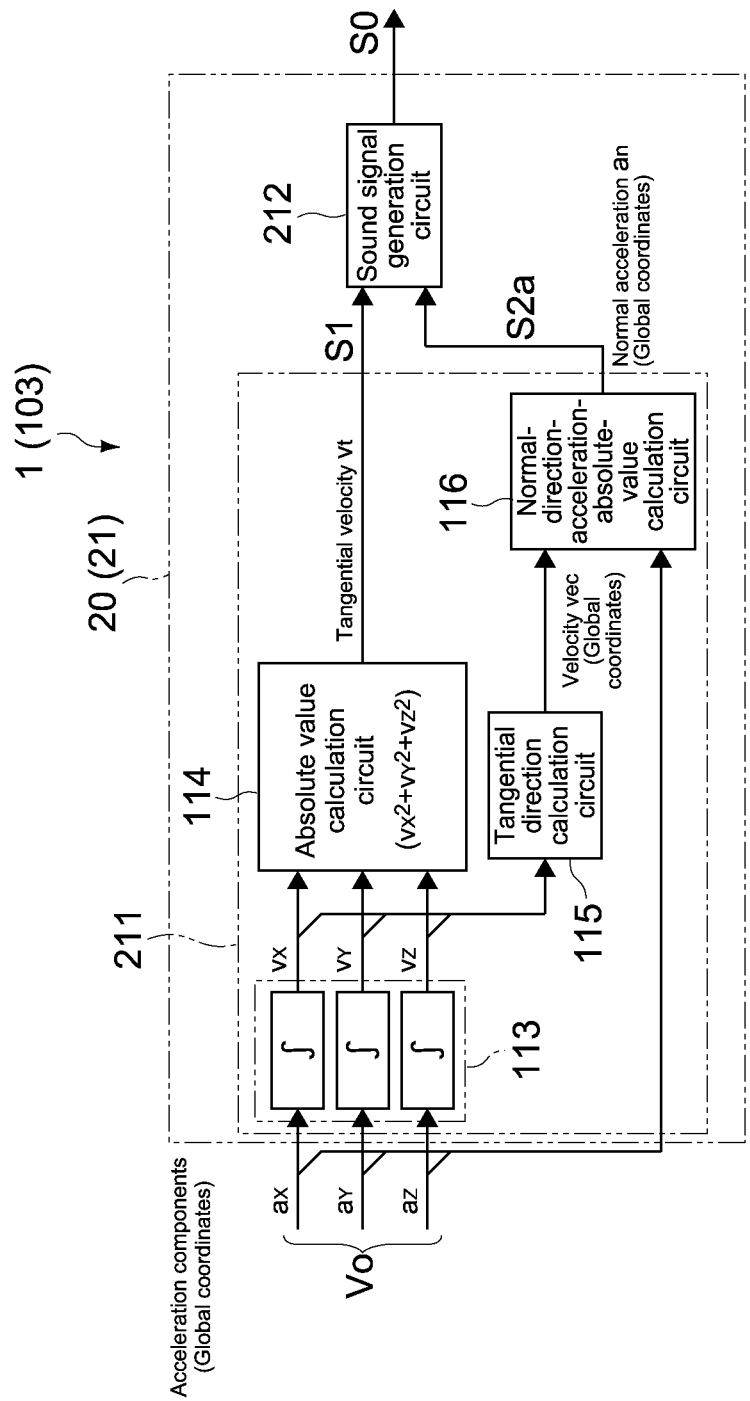
FIG. 8 is a block diagram showing a configuration example of the arithmetic circuit in the motion measurement apparatus.

FIG. 8 is a block diagram of a motion measurement system 103 showing another configuration example of the arithmetic circuit 211. It should be noted that, in FIG. 8, portions corresponding to those of FIG. 6 will be denoted by the same reference signs, and description thereof will be omitted.

The arithmetic circuit 211 further includes a tangential direction calculation circuit 115 and a normal-direction-acceleration-absolute-value calculation circuit 116. The normal direction calculation circuit 115 calculates a tangential direction (tangential velocity vector in global coordinate system) of the user U (sensor device 1A) on the basis of the velocity components ($v_X$, $v_Y$, $v_Z$) of the respective axes that are output from the integrator 113. The normal-direction-acceleration-absolute-value calculation circuit 116 calculates a normal acceleration ($a_n$) orthogonal to the tangential velocity vector, on the basis of the velocity components ($v_X$, $v_Y$, $v_Z$) of the respective axes that are output from the integrator 113 and the tangential velocity vector (velocity vec) output from the tangential direction calculation circuit 115.

The motion measurement system 103 in this example calculates the normal acceleration ($a_n$) as a second measurement signal, and inputs the calculated normal acceleration ($a_n$) to the signal generation circuit 212 so as to generate a control signal S0 obtained by modulating the first measurement signal S1 (tangential velocity ($v_t$)) by the second measurement signal S2a. This enables generation of a measurement signal Sw corresponding to the magnitude of the normal acceleration ($a_n$).

Configuration Example 4 of Arithmetic Circuit

Figure 9:
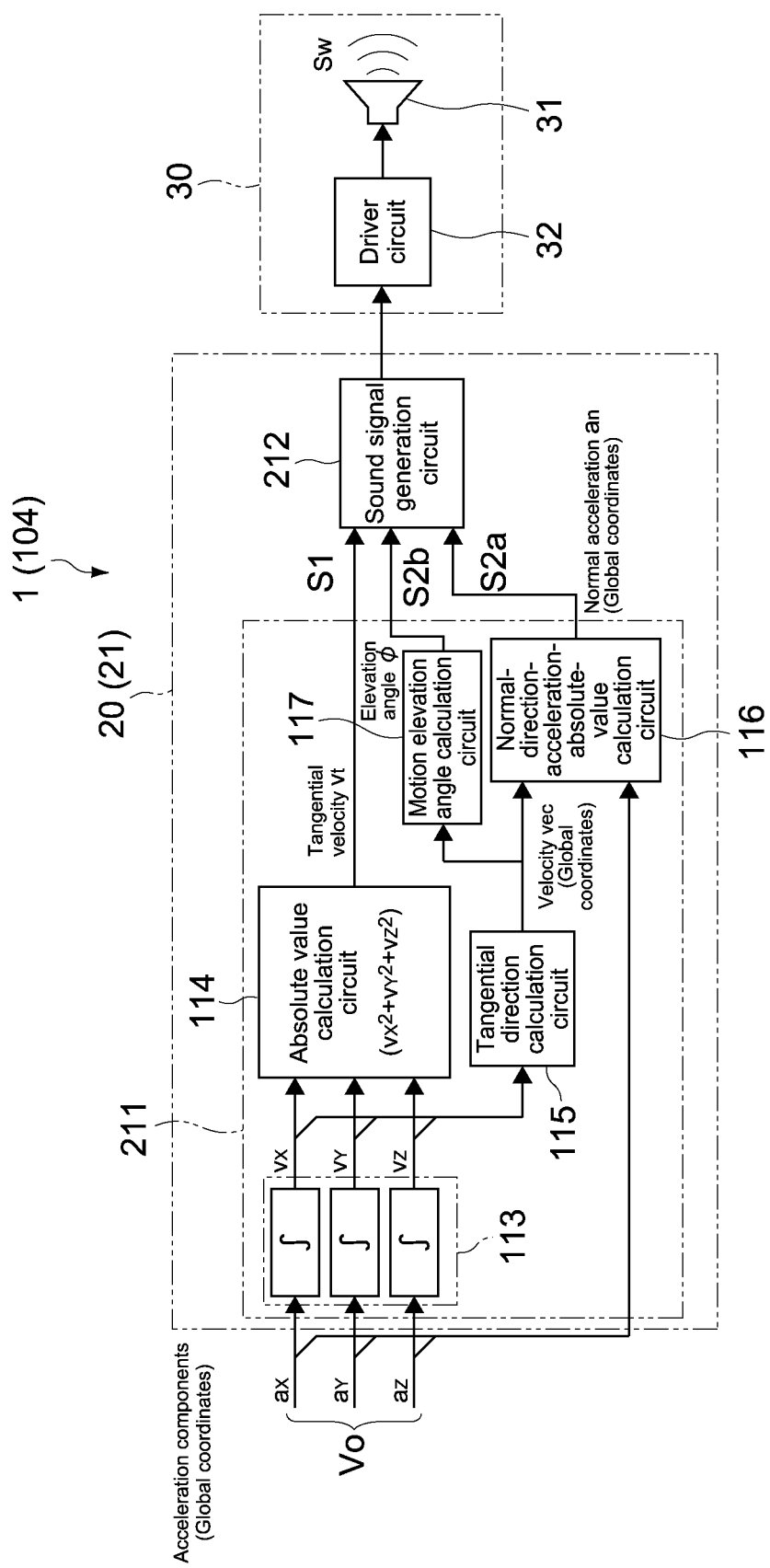
FIG. 9 is a block diagram showing a configuration example of the arithmetic circuit in the motion measurement apparatus.

FIG. 9 is a block diagram of a motion measurement system 104 showing another configuration example of the arithmetic circuit 211. It should be noted that, in FIG. 9, portions corresponding to those of FIG. 8 will be denoted by the same reference signs, and description thereof will be omitted.

The arithmetic circuit 211 further includes a motion elevation angle calculation circuit 117. The motion elevation angle calculation circuit 117 calculates a motion elevation angle ($\varphi$) on the basis of the tangential velocity vector output from the tangential direction calculation circuit 115.

The motion measurement system 104 in this example calculates the normal acceleration ($a_n$) and the motion elevation angle ($\varphi$) as second measurement signals S2a and S2b, and inputs the calculated normal acceleration ($a_n$) and motion elevation angle ($\varphi$) to the signal generation circuit 212 so as to generate a control signal S0 obtained by modulating the first measurement signal S1 (tangential velocity ($v_t$)) by those second measurement signals S2a and S2b. This enables generation of a measurement signal Sw corresponding to the magnitude of the normal acceleration ($a_n$) and that of the motion elevation angle ($\varphi$).

It should be noted that, in the configuration examples 3 and 4, the velocity-related information Vo (acceleration components ($a_X$, $a_Y$, $a_Z$)) input to the integrator 113 is acquired from both the acceleration sensor unit 12 and the angular velocity sensor unit 13 as in the configuration example 2 (FIG. 7). It should be noted that the present technology is not limited to the above, and the velocity-related information Vo may be acquired from only the acceleration sensor unit 12 as in the configuration example 1 (FIG. 6).

FIG. 10 is a diagram for describing a method of calculating the normal acceleration ($a_n$) and the motion elevation angle ($\varphi$).

Each of a tangential velocity vector, a tangential acceleration vector, and a normal acceleration vector of the sensor device 1A on a trajectory in the global coordinate system at an arbitrary time is as shown in FIG. 10.

The normal acceleration vector is a component of the acceleration vector orthogonal to the tangential velocity vector (component parallel to normal surface), and the motion elevation angle can be obtained from an angle formed by the tangential velocity vector and the XY plane.

In other words, as shown in FIG. 10, the normal acceleration vector can be obtained from the acceleration vector and a trajectory direction unit vector (see Expression (2)), and the trajectory direction unit vector and the motion elevation angle ($\varphi$) can be obtained from the velocity components ($v_X$, $v_Y$, $v_Z$) in the global coordinate system (see Expressions (1) and (3)). The normal acceleration ($a_n$) is calculated by taking an absolute value of the normal acceleration vector. It should be noted that the normal acceleration ($a_n$) and the motion elevation angle ($\varphi$) may be calculated by a method other than the method described above.

Figure 11:
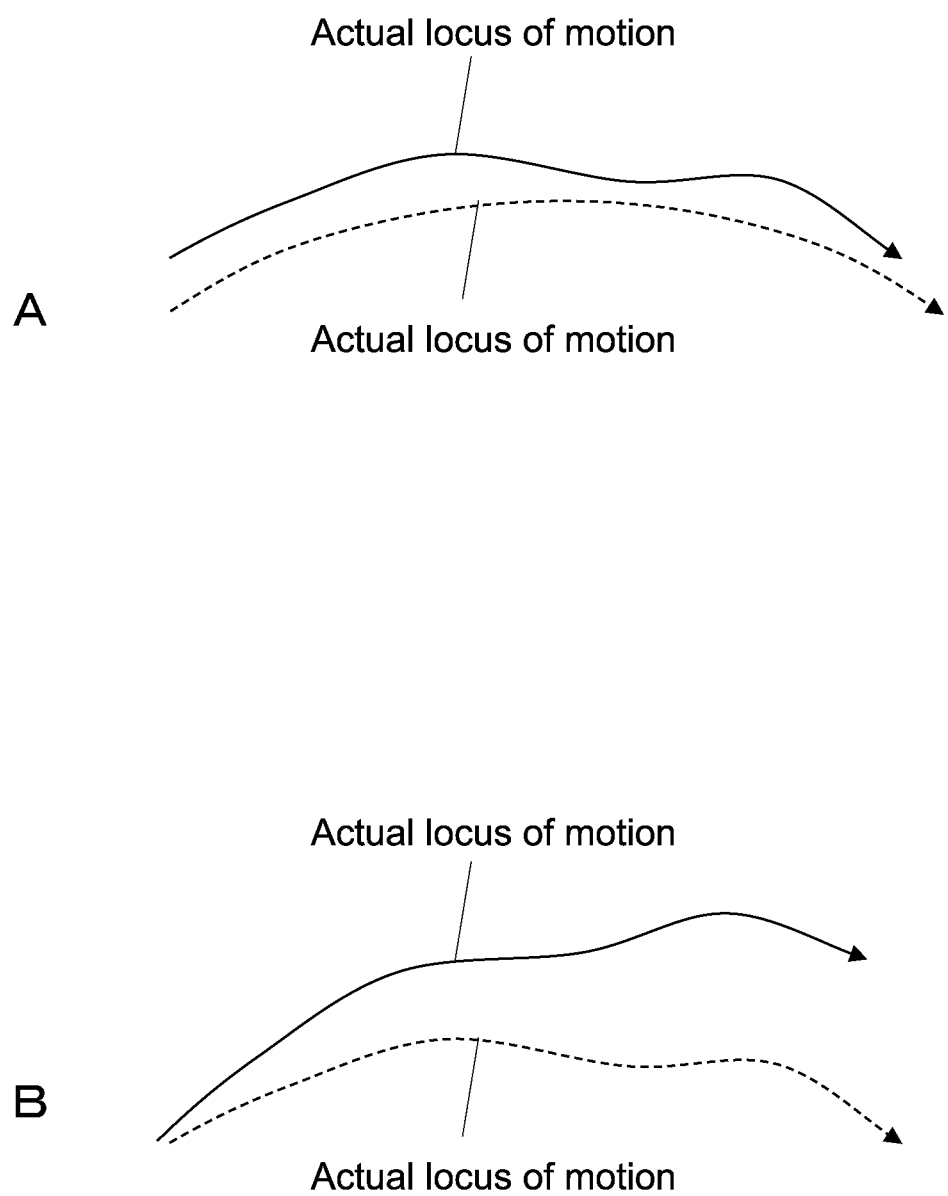
FIGS. 11A and 11b are conceptual diagrams for describing an action of the motion measurement apparatus.

A and B of FIG. 11 are schematic views for describing exemplary actions of the configuration examples 3 and 4. In A of FIG. 11, in the loci of a motion of the sensor device 1A indicated by the dotted line and the solid line, a measurement signal Sw of the same sound may be output in both the loci in the configuration example 2 in which only the tangential velocity ($v_t$) is referred to and the sound is modulated, but if the normal acceleration ($a_n$) is also referred to and the sound is modulated, both the loci can be distinguished from each other.

Further, according to the configuration example 4 in which the tangential velocity ($v_t$), the normal acceleration ($a_n$), and the motion elevation angle ($\varphi$) are referred to, more diverse measurements can be performed. For example, in the loci of the motion of the sensor device 1A indicated by the dotted line and the solid line in B of FIG. 11, a measurement signal Sw of the same sound may be output in both the loci in the configuration example 3, but according to the configuration example 4, a measurement signal Sw of different sound in both the loci can be output.

(Signal Generation Circuit)

The signal generation circuit 212 generates the control signal S0 for driving the output unit 30 and generating a measurement signal Sw on the basis of the kinematic physical quantity calculated in the arithmetic circuit 211. In this embodiment, the output unit 30 is constituted of a speaker that generates a sound wave as the measurement signal Sw, and thus the signal generation circuit 212 can have a configuration equivalent to an analog synthesizer including a sound signal generation circuit such as a voltage control oscillator (VCO), for example.

The signal generation circuit 212 generates the first measurement signal (S1) and the second measurement signal (S2), the first measurement signal (S1) corresponding to a single kinematic physical quantity (first kinematic physical quantity) selected from the plurality of kinematic physical quantities described above, the second measurement signal (S2) corresponding to another arbitrary one or a plurality of kinematic physical quantities (second kinematic physical quantities). The signal generation circuit 212 is configured as a modulator unit that generates, as the control signal S0, a modulation signal obtained by modulating the first measurement signal (S1) by the second measurement signal (S2). The second measurement signal S2 is configured to modulate an oscillation frequency, a scale, a tone, or the like associated with the first measurement signal S1.

Typically, as the first measurement signal S1 (tangential velocity) becomes larger, a sound signal of a higher scale is output, and as the second measurement signal S2 (normal acceleration, elevation angle, etc.) becomes larger, a stronger modulation component such as vibrato is added.

In this embodiment, as described above, the tangential velocity ($v_t$) of the sensor is referred to as a first kinematic feature amount, and the normal acceleration ($a_n$) of the sensor or the normal acceleration ($a_n$) and elevation angle ($v_\theta$) of the sensor is/are referred to as a second kinematic physical quantity or second kinematic physical quantities. Therefore, for example, in a case where the motion of the sensor device 1A is a linear motion, a control signal S0 based on the first measurement signal S1 is generated. Meanwhile, in a case where the motion of the sensor device 1A has a curved motion such as a circular motion or an ellipsoidal motion, a control signal S0 obtained by modulating the first measurement signal S1 by the second measurement signal S2 is generated (see A and B of FIG. 11).

It should be noted that the signal generation circuit 212 is not limited to the example in which the signal generation circuit 212 is provided to the controller unit 20, and the signal generation circuit 212 may be provided to the output unit 30 as will be described later.

Configuration Example 1 of Signal Generation Circuit

Figure 12:
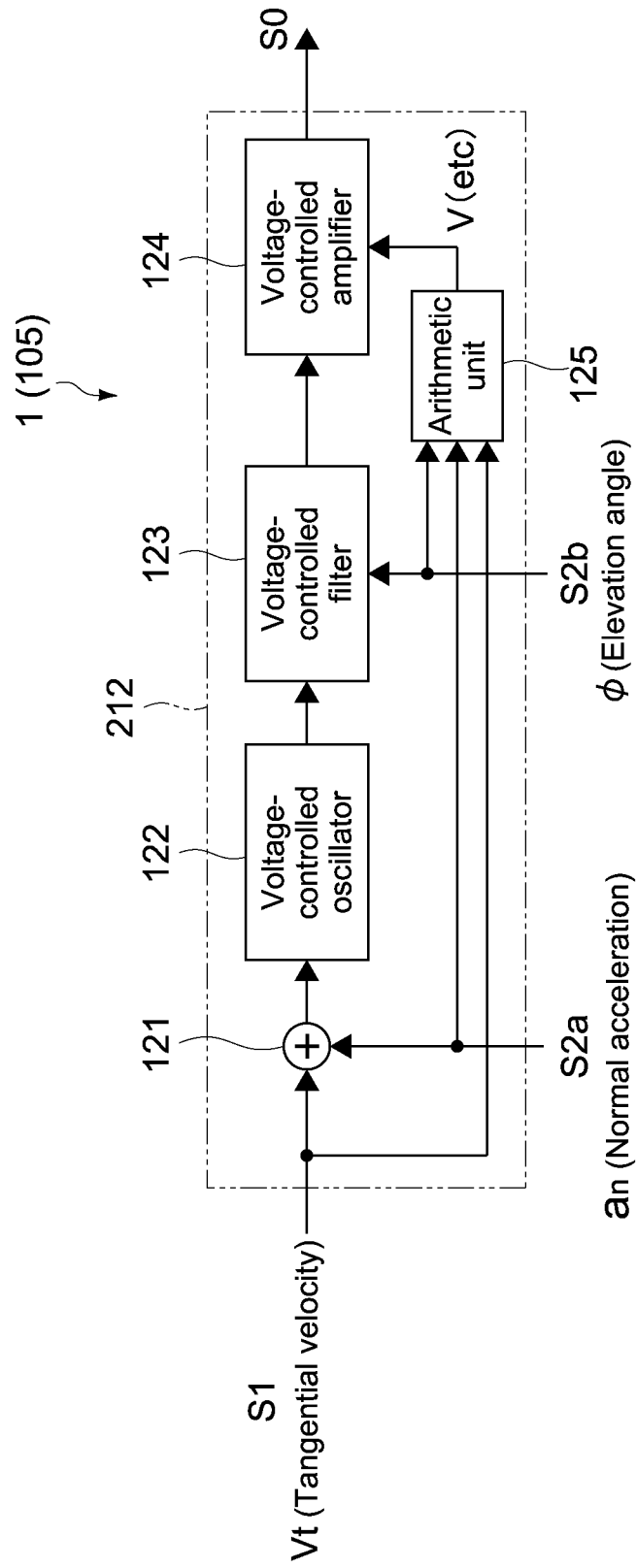
FIG. 12 is a block diagram showing a configuration example of a signal generation circuit in the motion measurement apparatus.

FIG. 12 is a block diagram of a motion measurement system 105 showing a configuration example of the signal generation circuit 212.

The signal generation circuit 212 includes an adder 121, a voltage-controlled oscillator (VCO) 122, a voltage-controlled filter (VCF) 123, a voltage-controlled amplifier (VCA) 124, and an arithmetic unit 125.

The adder 121 adds the first measurement signal S1 (that is a signal corresponding to the tangential velocity ($v_t$)) output from the absolute value calculation circuit 114 (see FIGS. 6 and 7) and the second measurement signal S2a (that is a signal corresponding to the normal acceleration ($a_n$)) output from the normal-direction-acceleration-absolute-value calculation circuit 116 (see FIGS. 8 and 9), to modulate the first measurement signal S1 by the second measurement signal S2a. The voltage-controlled oscillator 122 oscillates on the basis of the output of the adder 121. The voltage-controlled filter 123 modulates the output (e.g., tone) of the voltage-controlled oscillator 122 by a second measurement signal S2b (that is a signal corresponding to the motion elevation angle ($\varphi$)). The voltage-controlled amplifier 124 modulates the output of the voltage-controlled filter 123 by the output of the arithmetic unit 125 (that is a signal generated on the basis of the first and second measurement signals S1, S2a, and S2b) and generates a control signal S0. The arithmetic unit 125 outputs, to the voltage-controlled amplifier 123, a voltage signal for adjusting the control signal S0 to a volume optimized according to a motion pattern, a usage environment, or the like.

Configuration Example 2 of Signal Generation Circuit

Figure 13:
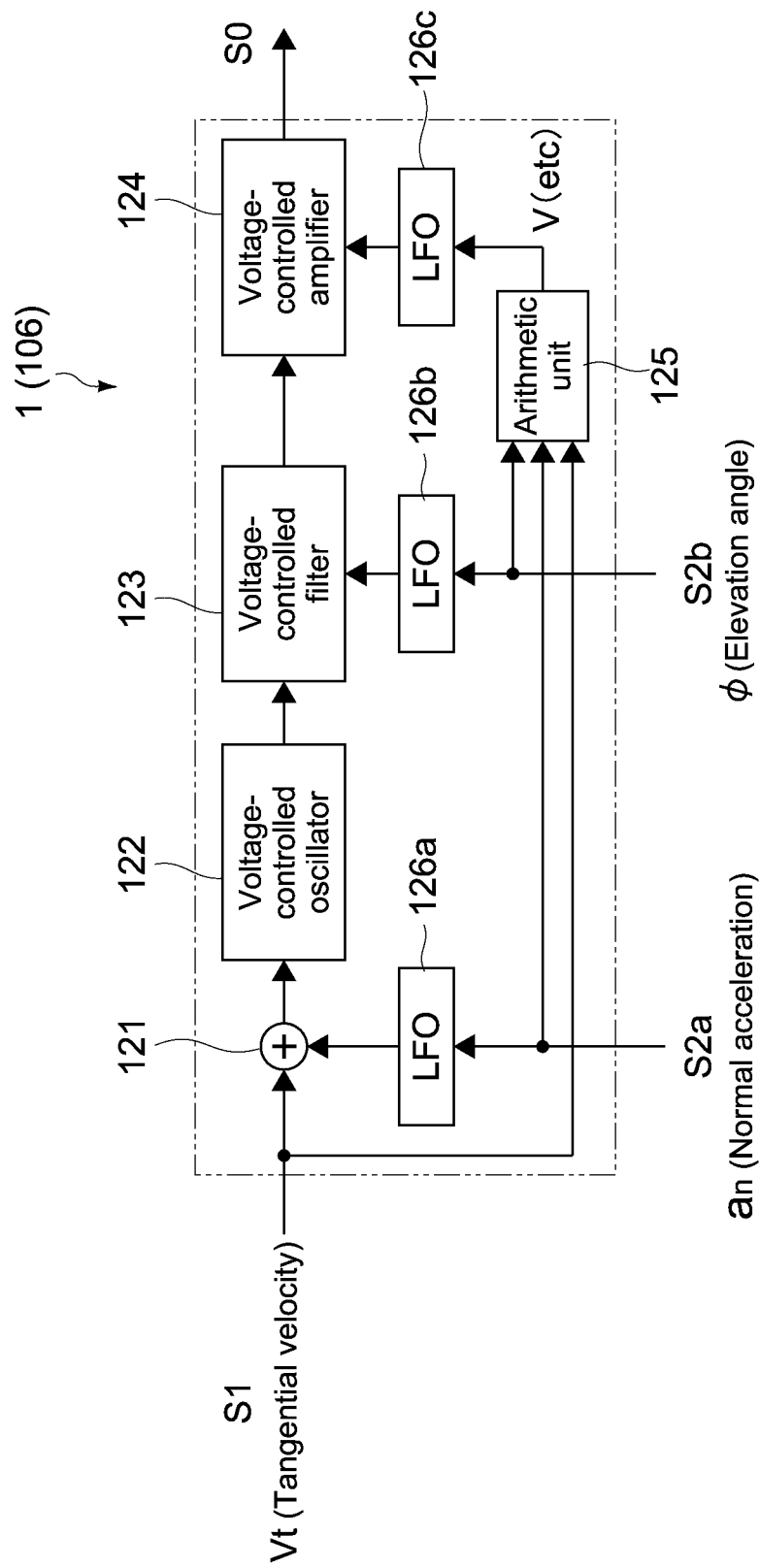
FIG. 13 is a block diagram showing a configuration example of the signal generation circuit in the motion measurement apparatus.

FIG. 13 is a block diagram of a motion measurement system 106 showing another configuration example of the signal generation circuit 212. It should be noted that, in FIG. 13, portions corresponding to those of FIG. 12 will be denoted by the same reference signs, and description thereof will be omitted.

The signal generation circuit 212 further includes LFOs (low frequency oscillators) 126a to 126c. The LFO 126a is provided at the input stage of the second measurement signal S2a in the adder 121 and modulates, for example, the frequency or intensity of "vibrato" on the basis of the normal acceleration ($a_n$). The LFO 126b is provided at the input stage of the second measurement signal S2b in the voltage-controlled filter 123 and modulates, for example, the frequency or intensity of "wow" on the basis of the motion elevation angle ($\varphi$). The LFO 126c is provided at the input stage of the arithmetic circuit 125 in the voltage-controlled amplifier 124 and modulates, for example, the frequency or intensity of "tremolo" on the basis of the motion pattern, the usage environment, or the like.

The signal generation circuit 212 is not limited to the example described above. For example, instead of or in addition to the configuration described above, a circuit that superimposes noise or programmed sound data, adds an EG (Envelop Generator), or adds an effector may be used.

[Operation of Motion Measurement System]

Figure 14:
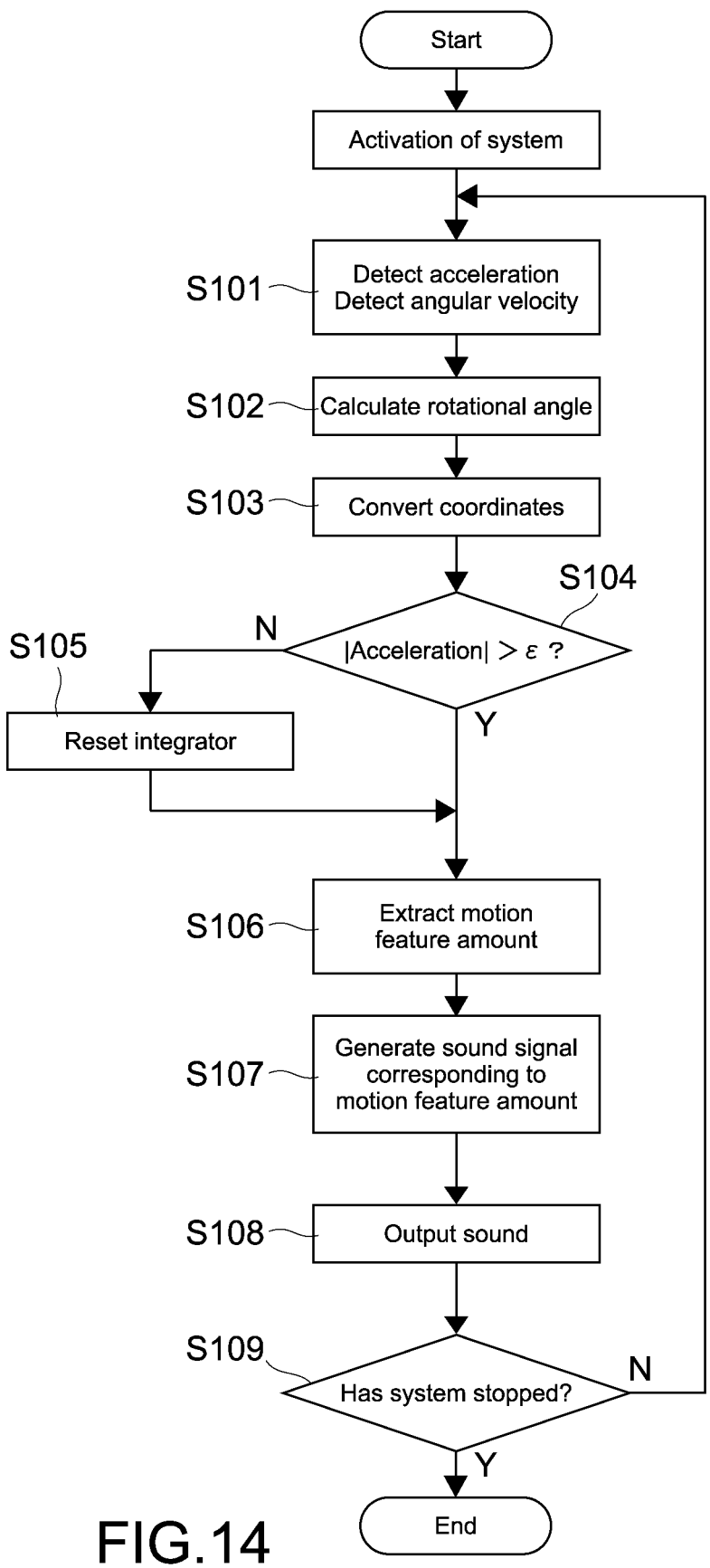
FIG. 14 is a flowchart for describing an operation example of the motion measurement system.

Subsequently, a typical operation of the motion measurement system 1 thus configured will be described. FIG. 14 is a flowchart for describing an operation example of the motion measurement system 1. Here, the motion measurement systems 102 and 104 that have been described with reference to FIGS. 7 and 9 will be described as an example.

When the system is activated by power-on of the power supply or the like, the sensor device 1A detects acceleration components ($a_x$, $a_y$, $a_z$) and angular velocity components ($\omega_x$, $\omega_y$, $\omega_z$) in the local coordinate system of the sensor device 1A by the acceleration sensor unit 12 and the angular velocity sensor unit 13 (Step 101). The detected acceleration components and angular velocity components are output, as velocity-related information Vo, to the feature amount extraction unit 21 (arithmetic unit 211) of the controller unit 20.

With the velocity-related information Vo supplied to the feature amount extraction unit 21 (arithmetic unit 211), a rotational angle is detected by the angle calculation circuit 111 (Step 102). Further, the coordinates of the acceleration components ($a_x$, $a_y$, $a_z$) in the local coordinate system are converted into coordinates of the acceleration components ($a_x$, $a_y$, $a_z$) in the global coordinate system by the coordinate rotation circuit 112 (Step 103).

Subsequently, the feature amount extraction unit 21 (arithmetic unit 211) inputs the acceleration components ($a_X$, $a_Y$, $a_Z$) to the integrator 113, calculates velocity components ($v_X$, $v_Y$, $v_Z$) in the global coordinate system, and extracts a motion feature amount (Step 106). At that time, it is determined whether each absolute value of the acceleration components ($a_X$, $a_Y$, $a_Z$) of each axis is larger than a predetermined value $\varepsilon$ or not. If the absolute value is equal to or smaller than the predetermined value $\varepsilon$, the integrator 113 is reset, and the motion feature amount is then extracted (Steps 104 to 106). The predetermined value $\varepsilon$ is set on the basis of a measurement limit that is determined by an error (noise, offset) of the acceleration sensor, the angular velocity sensor, the analog circuit, or the like. This allows extraction of a highly accurate motion feature amount in which an impact of an integration error is suppressed, in a case where the absolute value of the acceleration is equal to or smaller than the predetermined position E. This processing may be executed independently for each of the coordinate axes or may be determined on the basis of the absolute value of the acceleration in the three-dimensional space, which is obtained from a square root of the sum of the squares of the values of the respective coordinate axes ($\sqrt{(a_X^2+a_Y^2+a_Z^2)}$).

The arithmetic unit 211 extracts, as a first kinematic physical quantity, the motion feature amount including the tangential velocity ($v_t$) of the sensor device 1A by the absolute value calculation circuit 114 and outputs a first measurement signal S1 corresponding thereto to the signal generation circuit 212. The signal generation circuit 212 generates a sound signal (control signal S0) corresponding to the first measurement signal S1, outputs the sound signal to the output unit 30, and causes the output unit 30 to generate a measurement signal Sw (Steps 107 and 108, FIG. 9).

The arithmetic unit 211 further calculates, as second kinematic physical quantities, a normal acceleration ($a_n$) and a motion elevation angle ($\varphi$) of the sensor device 1A and outputs second measurement signals S2a and S2b corresponding thereto to the signal generation circuit 212. The signal generation circuit 212 modulates the first measurement signal S1 on the basis of the second measurement signals S2a and S2b and outputs the modulated control signal S0 to the output unit 30. Thus, a frequency, a tone, an intensity, or the like of a sound wave associated with the tangential velocity ($v_t$) is modulated on the basis of the normal acceleration ($a_n$) and the motion elevation angle ($\varphi$) (Steps 107 and 108, FIG. 9).

The various kinematic physical quantities extracted in the feature amount extraction unit 21 are referred to, as needed, for extraction of the presence/absence of a particular motion pattern in the motion recognition unit 22 or the like, or are displayed in a predetermined mode on the display unit 407 of the terminal device 1B, and recorded in the memory 402 (see FIG. 5). Examples of a display mode in the display unit 407 include a waveform or log representing a temporal change in predetermined kinematic physical quantity, and the memory 402 takes in the log. The kinematic physical quantities displayed on the display unit 407 or recorded in the memory 402 are not limited to the tangential velocity, the normal acceleration, and the motion elevation angle, and may include various types of data such as an angular velocity, a tangential acceleration, a horizontal acceleration, a vertical acceleration, a horizontal velocity, and a vertical velocity. Further, in a case where the motion recognition unit 22 recognizes the presence of a particular motion pattern, the system may be configured to emit a sound effect such as an alarm or an alert via the speaker 408 of the terminal device 1B.

The processing is repeatedly executed in the predetermined sampling periods described above until the system stops (Step 109).

As described above, according to this embodiment, since the motion of the sensor device 1A attached to the user U is output as a sound signal perceivable for the user U, the user U can more intuitively grasp a moving posture or a trajectory of the detection target.

For example, in the pitching practice shown in FIG. 2, as the tangential velocity of the arm to which the sensor device 1A is attached becomes larger, sound of a higher scale is output after the operation or during the operation. Thus, the user can grasp the user's pitch speed (throwing velocity) by the sound in real time. Further, with the difference in sound to be output, it is possible to intuitively perform comparison with an operation of another person such as a fellow member or a coach. Furthermore, it becomes possible to easily determine whether a target tangential velocity is attained or not or confirm the condition of the user, a pitching form, or the like.

Hereinafter, temporal changes in various physical quantities to be measured in the sensor device 1A attached to the arm of the user U who practices pitching will be described with reference to FIGS. 15 to 19.

Figure 15:
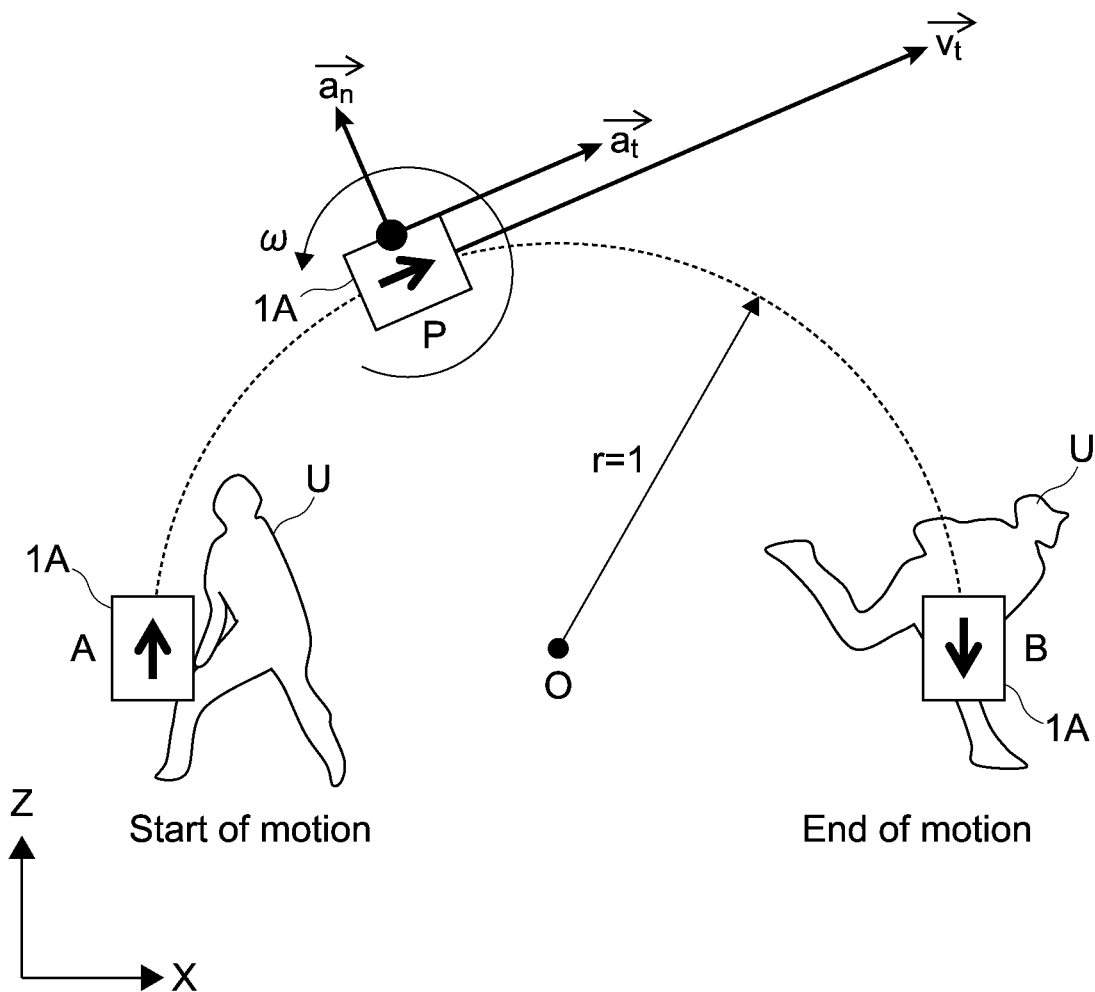
FIG. 15 is a diagram for describing an action of the motion measurement apparatus.

It should be noted that, for easy description, the trajectory of a motion, the velocity, the acceleration, and the coordinate system are assumed to be on the same plane (XZ plane), the motion is assumed to be a circular motion having a trajectory radius (r) of 1 m, and a time period of a series of operations from the start of the motion to the end of the motion (movement time period of the sensor device 1A from A position to B position in FIG. 15) is assumed to be 1 second.

Figure 16:
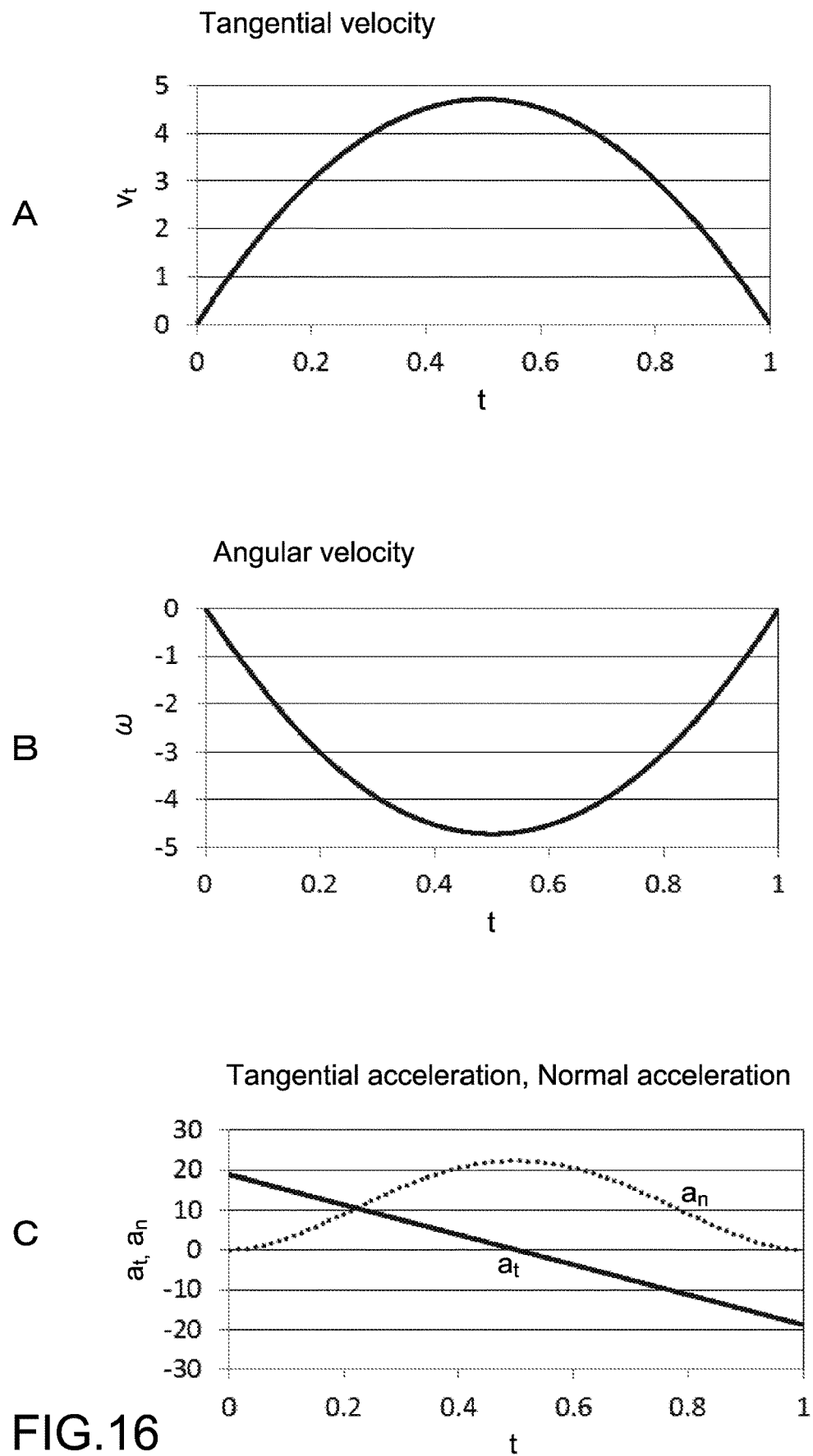
FIGS. 16A, 16B, and 16C are diagrams for describing an action of the motion measurement apparatus.

A of FIG. 16 shows the tangential velocity ($v_t$) calculated in Expression (4) of FIG. 15. The tangential velocity ($v_t$) corresponds to a velocity in a movement direction of the sensor device 1A. Relationships between the tangential velocity ($v_t$) and each of a movement distance (L), the angular velocity ($\omega$), the tangential acceleration ($a_t$), and the normal acceleration ($a_n$) are expressed by Expressions (5) to (8) of FIG. 15. B and C of FIG. 16 show the angular velocity ($\omega$), the tangential acceleration ($a_t$), and the normal acceleration ($a_n$) respectively calculated by Expressions (6) to (8). For the angular velocity ($\omega$), a counterclockwise direction shown in FIG. 15 was set to be positive.

Figure 17:
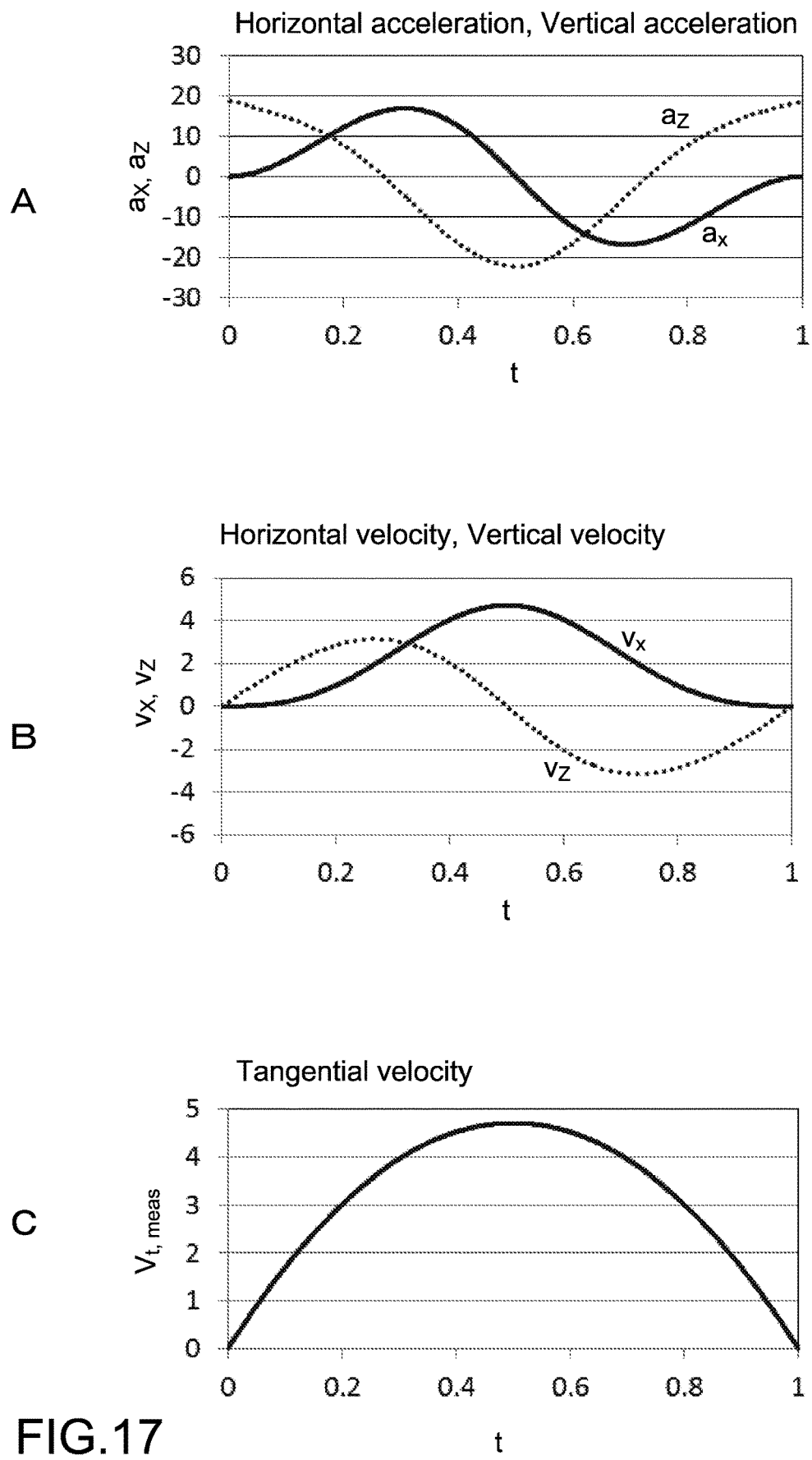
FIGS. 17A, 17B, and 17C are diagrams for describing an action of the motion measurement apparatus.

A and B of FIG. 17 respectively show examples of temporal changes in horizontal and vertical accelerations ($a_X$, $a_Z$) and the horizontal and vertical velocities ($v_X$, $v_Z$) that are calculated from the velocity-related information Vo acquired in the sensor device 1A.

The horizontal acceleration ($a_X$) and the vertical acceleration ($a_Z$) are accelerations in the horizontal direction and the vertical direction in the global coordinate system, which are calculated from the angular velocity ($\omega$), the tangential acceleration ($a_t$), and the normal acceleration ($a_n$) in B and C of FIG. 16. The horizontal velocity ($v_X$) and the vertical velocity ($v_Z$) are velocities in the horizontal direction and the vertical direction in the global coordinate system, which are obtained by performing time integration on the horizontal acceleration ($a_X$) and the vertical acceleration ($a_Z$) in A of FIG. 17, respectively.

C of FIG. 17 shows a measurement value ($v_{t,\ meas}$) of the tangential velocity that is obtained from the horizontal velocity ($v_X$) and the vertical velocity ($v_Z$) in B of FIG. 17. If the absolute value measurement for the vector sum of the horizontal velocity ($v_X$) and the vertical velocity ($v_Z$) is correctly performed, the measurement value ($v_{t,\ meas}$) of the tangential velocity coincides with the tangential velocity ($v_t$) shown in A of FIG. 16.

A of FIG. 18 shows a measurement value ($a_{n,\ meas}$) of the normal acceleration that is obtained from the horizontal acceleration ($a_X$), the vertical acceleration ($a_Z$), the horizontal velocity ($v_X$), and the vertical velocity ($v_Z$) in A and B of FIG. 17, and corresponds to the normal acceleration ($a_n$) shown in C of FIG. 16.

B of FIG. 18 shows a waveform of the input component of the VCO (corresponding to the voltage-controlled oscillator 122 in the signal generation circuit 212) in a state where the measurement value ($a_{n,\ meas}$) of the normal acceleration is added to the measurement value ($v_{t,\ meas}$) of the tangential velocity. Here, a state where a sine wave of 10 Hz is amplitude-modulated for scaling by the measurement value ($a_{n,\ meas}$) of the normal acceleration is shown.

Figure 19:
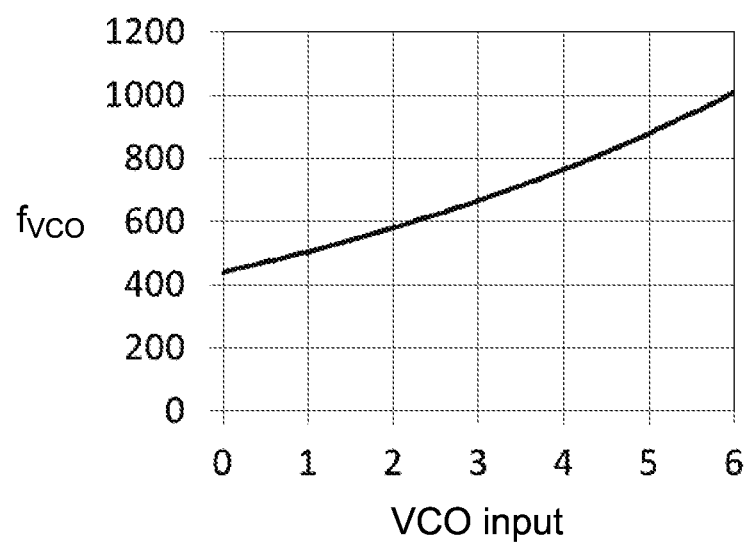
FIG. 19 is a diagram for describing an action of the motion measurement apparatus.

C of FIG. 18 shows a temporal change in frequency (fvco) of the VCO in B of FIG. 18. It is found that a strong vibrato is added depending on the magnitude of the normal acceleration. FIG. 19 shows an example of input/output characteristics of the VCO, in which a relationship where fvco=440 Hz$\times 2^{vco\ input/5}$ is established. For example, assuming that the fvco during rest is 440 Hz and the fvco at the time a target tangential velocity is attained is 880 Hz, just octave sound is output at the time the target tangential velocity is attained.

Second Embodiment

Figure 20:
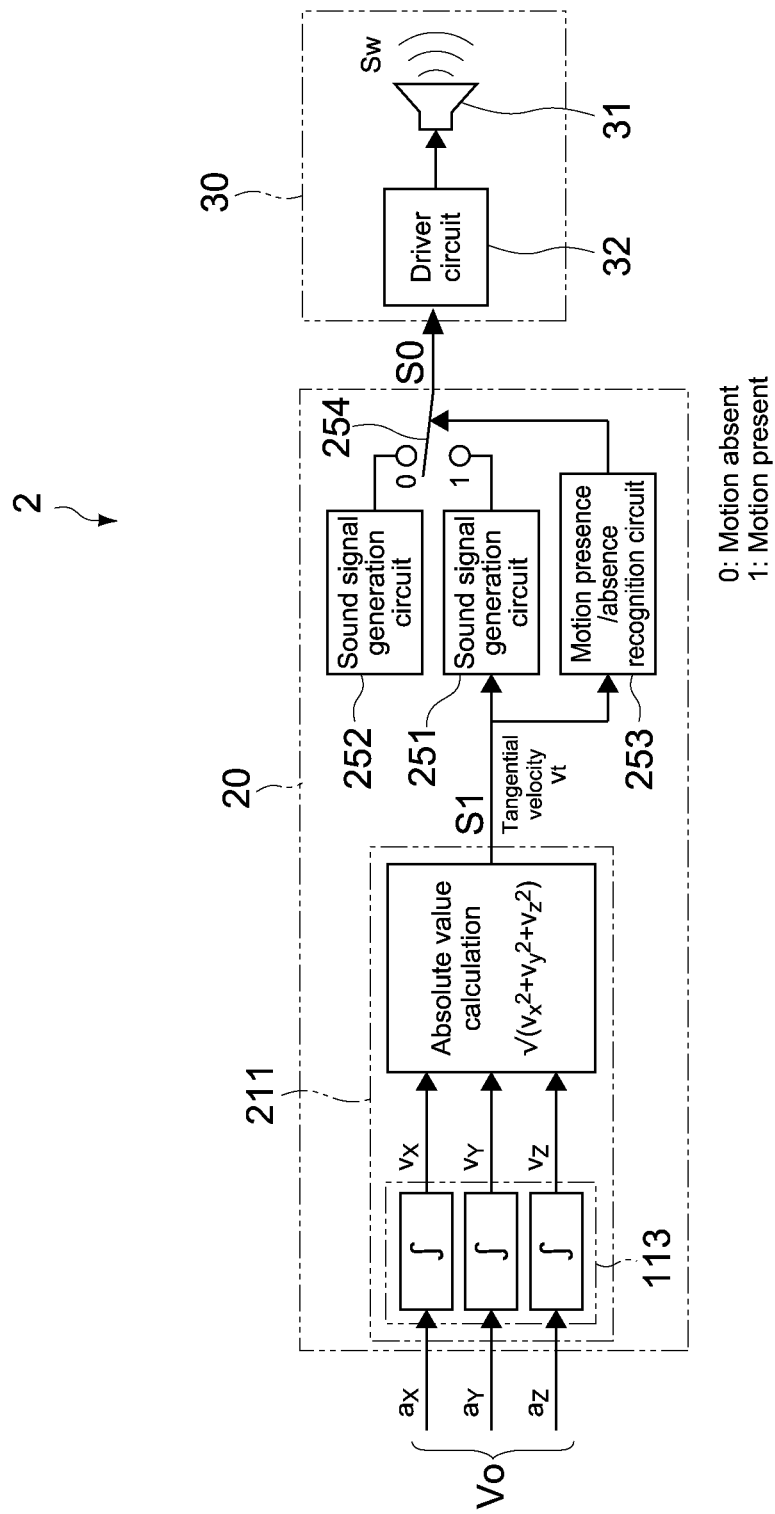
FIG. 20 is a block diagram showing a configuration of a motion measurement apparatus according to a second embodiment of the present technology.

FIG. 20 shows a configuration of a motion measurement system according to a second embodiment of the present technology.

Hereinafter, a configuration different from that of the first embodiment will be mainly described, and a configuration similar to that of the first embodiment will be denoted by a similar reference sign and description thereof will be omitted or simplified.

As shown in the figure, a motion measurement system 2 of this embodiment is different from the first embodiment in that the motion measurement system 2 includes a first sound signal generation 251, a second sound signal generation circuit 252, a motion presence/absence recognition circuit 253, and a switching circuit 254.

The first sound signal generation circuit 251 corresponds to the signal generation circuit 212 described in the first embodiment. The second sound signal generation circuit 252 generates a signal different from the signal to be output from the first signal generation circuit 251, e.g., a sound signal having a constant frequency, intensity, or the like, such as white noise.

The motion presence/absence recognition circuit 253 is a circuit that determines whether the motion of the sensor device 1A is present or absent on the basis of the first measurement signal S1 (tangential velocity ($v_t$)) output from the arithmetic unit 211. In a case where the magnitude of the tangential velocity ($v_t$) exceeds a predetermined value, the motion presence/absence recognition circuit 253 determines that the sensor device 1A is in motion, and in a case where the magnitude of the tangential velocity ($v_t$) is equal to or lower than the predetermined value, the motion presence/absence recognition circuit 253 determines that the sensor device 1A is at rest. The switching circuit 254 is controlled by the motion presence/absence recognition circuit 253. In a case where the sensor device 1A is in motion (where a motion is present), the switching circuit 254 transmits the output of the first sound signal generation circuit 251 to the output unit 30, and in a case where the sensor device 1A is at rest (where a motion is absent), the switching circuit 254 transmits the output of the second sound signal generation circuit 252 to the output unit 30.

Figure 21:
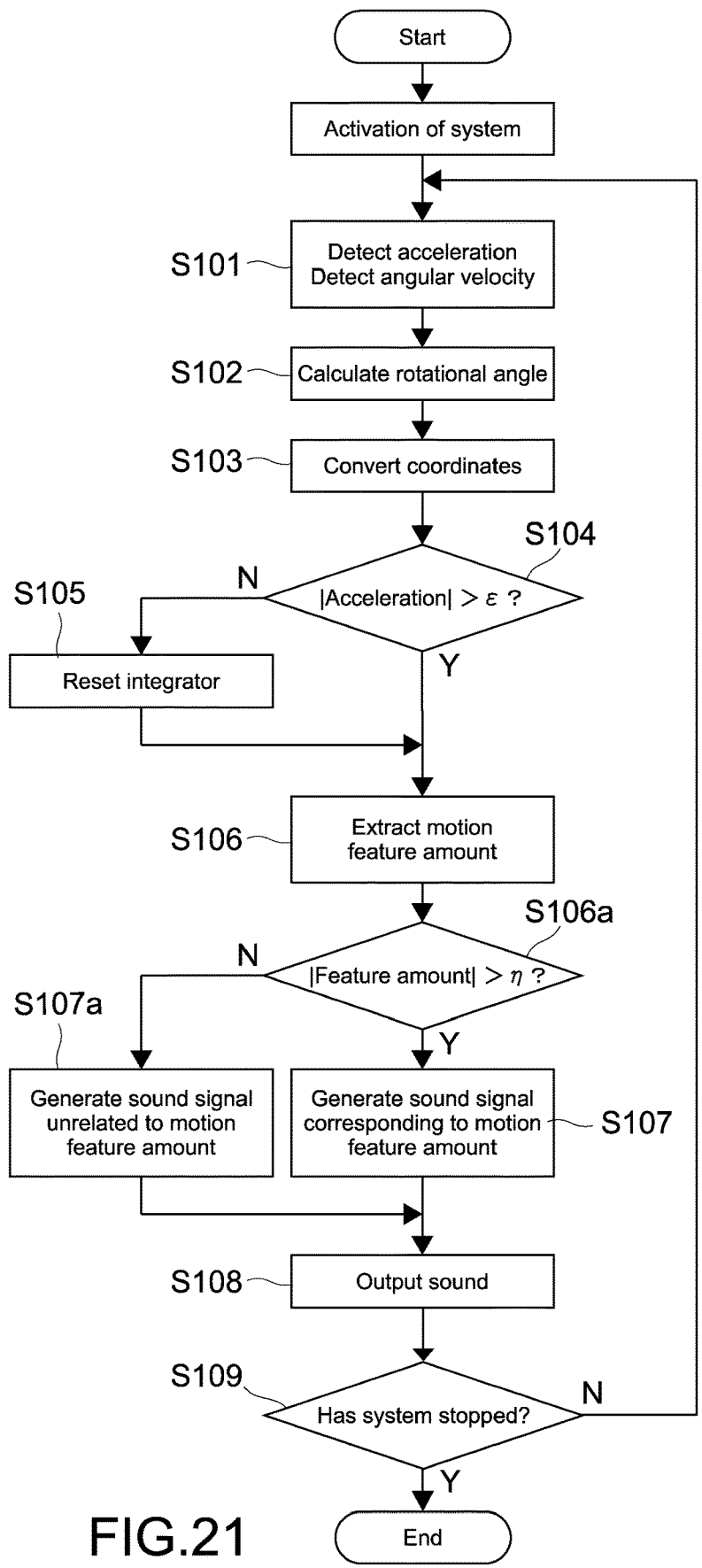
FIG. 21 is a flowchart showing a typical operation example of the motion measurement system.

FIG. 21 is a flowchart showing a typical operation example of the motion measurement system 2. It should be noted that portions corresponding to those of FIG. 14 will be denoted by the same reference signs, and detailed description thereof will be omitted.

The motion measurement system 2 of this embodiment determines whether the absolute value of the motion feature amount (tangential velocity ($v_t$)) extracted in the arithmetic unit 211 is larger than a predetermined value η or not (Step 106a). If the absolute value of the motion feature amount is larger than the predetermined value η, the output of the first sound signal generation circuit 251 is transmitted to the output unit 30, and if the absolute value of the motion feature amount is equal to or smaller than the predetermined value η, instead of the output of the first sound signal generation circuit 251, the output of the second sound signal generation circuit 252 is transmitted to the output unit 30 (Steps 107 and 107a).

The predetermined value η is not particularly limited and is typically set to an appropriate value with which the presence/absence of the motion can be determined. The present technology is not limited thereto, and the predetermined value η may be set to have an appropriate magnitude with which the extent of the motion can be recognized.

In this embodiment as well, an action and effect similar to those of the first embodiment described above can be obtained. In particular, according to this embodiment, a sound signal is configured to be switched on the basis of the presence/absence of a distinguishing motion of interest or the extent thereof, and thus it is possible to inhibit a meaningless sound signal from being generated at the time the user U is at rest or in a state before a series of predetermined operations to be measured is performed.

It should be noted that the second sound signal generation circuit 252 may be configured to generate a silent signal instead of a sound signal such as white noise. The motion measurement system 2 can also be configured to omit the installation of the second sound signal generation circuit 252 and simply switch the presence/absence of the output of the first sound signal generation circuit 251.

Third Embodiment

Figure 22:
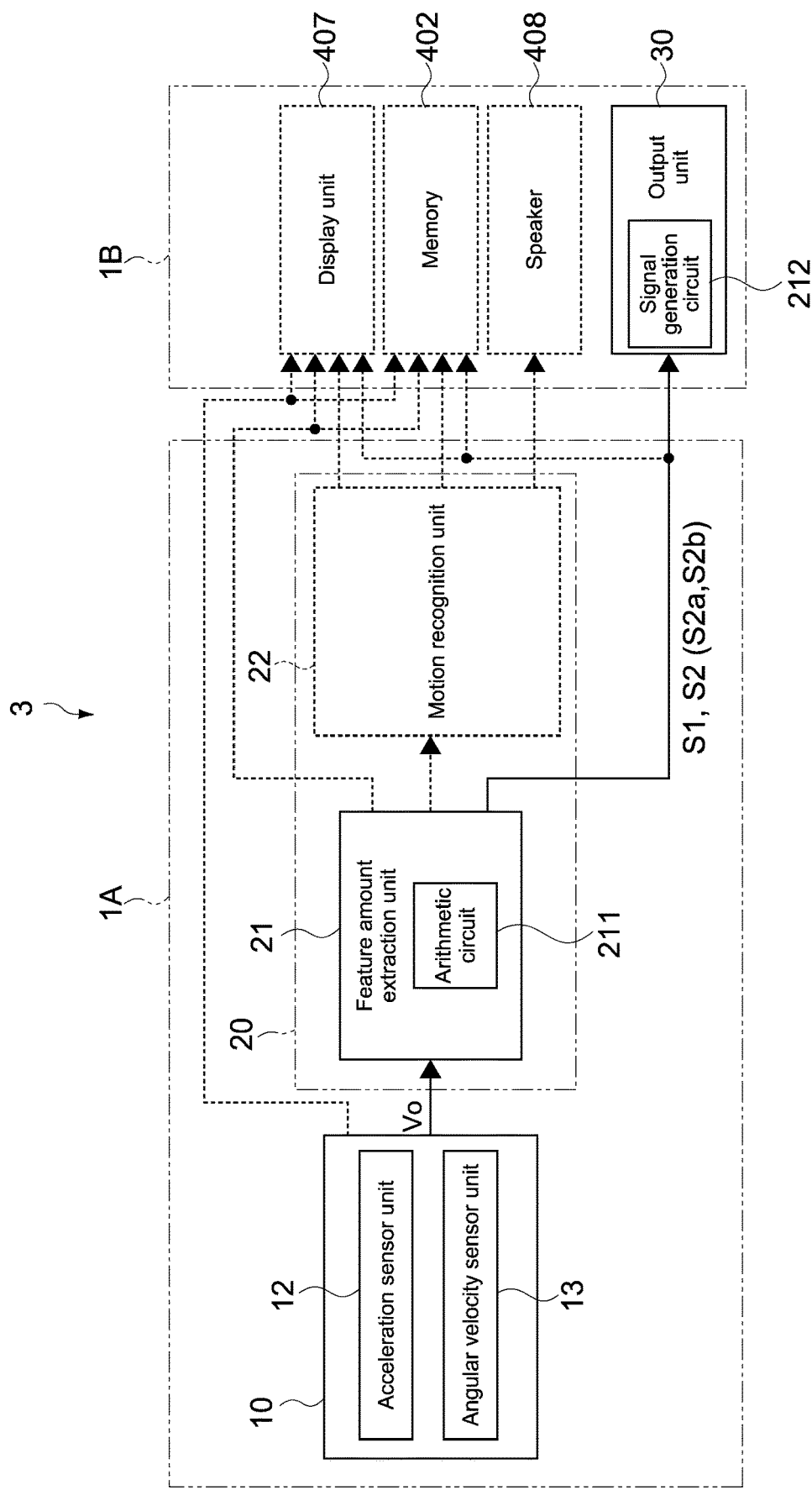
FIG. 22 is a block diagram showing a configuration of a motion measurement apparatus according to a third embodiment of the present technology.

FIG. 22 shows a configuration of a motion measurement system according to a third embodiment of the present technology.

Hereinafter, a configuration different from that of the first embodiment will be mainly described, and a configuration similar to that of the first embodiment will be denoted by a similar reference sign and description thereof will be omitted or simplified.

A motion measurement system 3 of this embodiment is different from the first embodiment in that the signal generation circuit 212 is provided to the output unit 30. In this embodiment, the first and second measurement signals S1 and S2 (S2a and S2b) generated in the arithmetic circuit 211 are output to the output unit 30, and a control signal S0 based on those measurement signals is generated in the signal generation circuit 212 of the output unit 30. In such a configuration as well, an action and effect similar to those of the first embodiment can be obtained.

In particular, according to this embodiment, the signal generation circuit 212 is provided to the output unit 30, and thus an operation load of the controller unit 20 is reduced. This can suppress the cost for establishing the sensor device 1A. Further, use of the CPU 401 of the terminal device 1B (see FIG. 4) enables signal generation processing having a large operation load to be performed at higher speed, so that a sound signal with high extensibility can be presented in real time.

Fourth Embodiment

Figure 23:
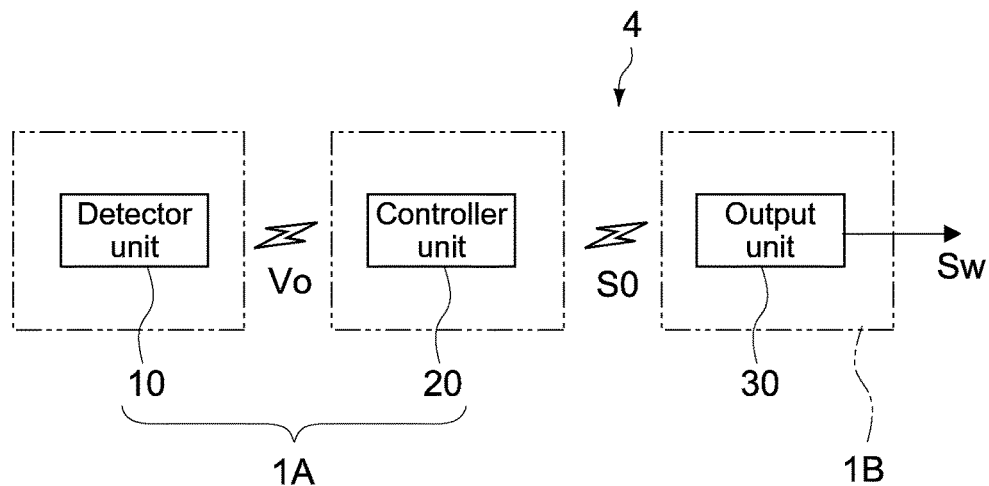
FIG. 23 is a block diagram showing a configuration of a motion measurement apparatus according to a fourth embodiment of the present technology.

FIG. 23 shows a configuration of a motion measurement system according to a fourth embodiment of the present technology.

Hereinafter, a configuration different from that of the first embodiment will be mainly described, and a configuration similar to that of the first embodiment will be denoted by a similar reference sign and description thereof will be omitted or simplified.

A motion measurement system 4 of this embodiment is different from the first embodiment in that the detector unit 10, the controller unit 20, and the output unit 30 are configured as separate devices capable of communicating with one another wirelessly or by other methods. In such a configuration as well, an action and effect similar to those of the first embodiment can be obtained.

In particular, according to this embodiment, a usage mode in which the detector unit 10 is attached to a detection part of the user U (e.g., arm), and the controller unit 20 is attached to a part different from the detection part (e.g., lumbar part) can be employed, for example. With this configuration, a reduction in size of the casing of the detector unit 10 can be achieved, and design specifications of mechanical durability of the controller unit 20 can be relaxed.

Fifth Embodiment

Figure 24:
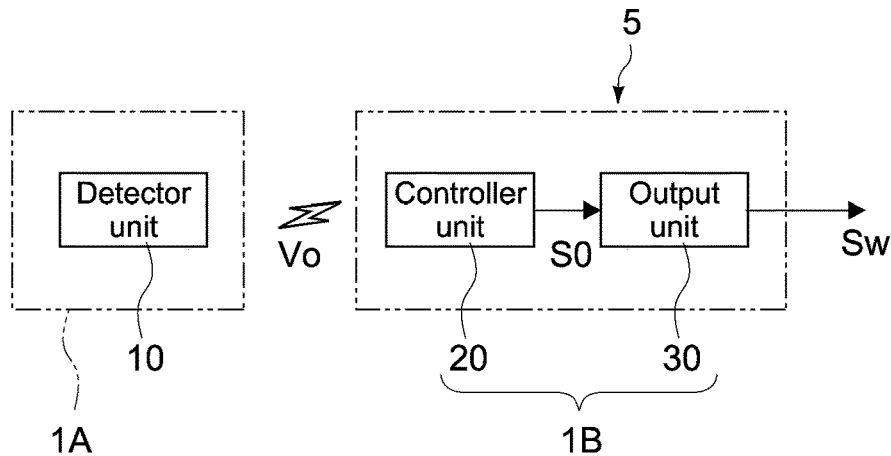
FIG. 24 is a block diagram showing a configuration of a motion measurement apparatus according to a fifth embodiment of the present technology.

FIG. 24 shows a configuration of a motion measurement system according to a fifth embodiment of the present technology.

Hereinafter, a configuration different from that of the first embodiment will be mainly described, and a configuration similar to that of the first embodiment will be denoted by a similar reference sign and description thereof will be omitted or simplified.

A motion measurement system 5 of this embodiment is different from the first embodiment in that the controller unit 20 is housed in the terminal device 1B together with the output unit 30. In this case, the controller unit 20 is configured to be capable of mutually communicating with the detector unit 10 wirelessly or by other methods. In such a configuration as well, an action and effect similar to those of the first embodiment can be obtained.

In particular, according to this embodiment, only the detector unit 10 is attached to the detection target such as the user U. Thus, as in the fourth embodiment, a reduction in size of the casing of the detector unit 10 can be achieved, and design specifications of mechanical durability of the controller unit 20 can be relaxed.

Sixth Embodiment

Figure 25:
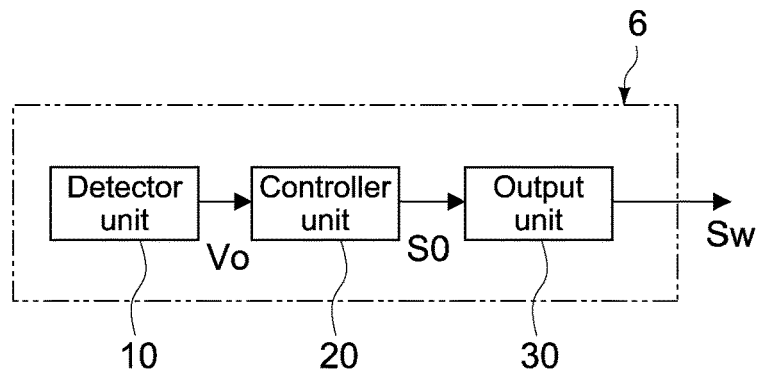
FIG. 25 is a block diagram showing a configuration of a motion measurement apparatus according to a sixth embodiment of the present technology.

FIG. 25 shows a configuration of a motion measurement system according to a sixth embodiment of the present technology.

Hereinafter, a configuration different from that of the first embodiment will be mainly described, and a configuration similar to that of the first embodiment will be denoted by a similar reference sign and description thereof will be omitted or simplified.

A motion measurement system 6 of this embodiment is different from the first embodiment in that the motion measurement system 6 is configured as a single device in which the detector unit 10 and the controller unit 20 are housed in a casing common to the output unit 30. In such a configuration as well, an action and effect similar to those of the first embodiment can be obtained.

In particular, according to this embodiment, the single device can measure a motion and output a measurement result thereof, and thus the motion measurement can be more readily performed. Further, since a sound signal corresponding to the motion of this device is output, it is also possible to configure this device as a musical instrument.

Seventh Embodiment

Figure 26:
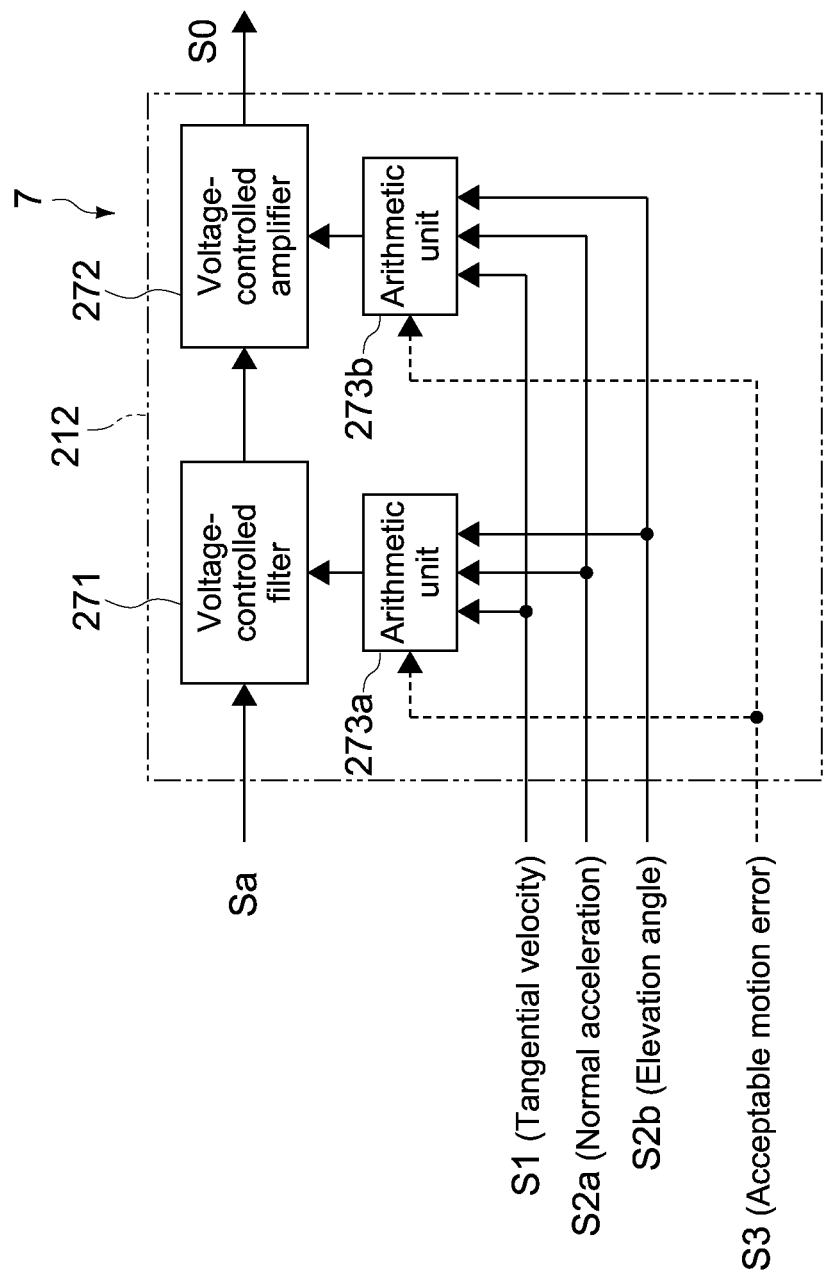
FIG. 26 is a block diagram showing a configuration of a motion measurement apparatus according to a seventh embodiment of the present technology.

FIG. 26 shows a configuration of a motion measurement system according to a seventh embodiment of the present technology.

Hereinafter, a configuration different from that of the first embodiment will be mainly described, and a configuration similar to that of the first embodiment will be denoted by a similar reference sign and description thereof will be omitted or simplified.

A motion measurement system 7 of this embodiment is different from the first embodiment in the configuration of the signal generation circuit 212. It should be noted that illustration of the detector unit 10, the arithmetic circuit 211, and the output unit 30 is omitted.

The signal generation circuit 212 of this embodiment includes a voltage-controlled filter (VCF) 271, a voltage-controlled amplifier (VCA) 272, and arithmetic units 273a and 273b.

An external sound source signal Sa and the output of the arithmetic unit 273a are input to the voltage-controlled filter 271. Examples of the external sound source signal Sa include a sound signal output from a musical instrument, a sound signal detected by a microphone or the like, and a sound signal acquired from another sound source. The first and second measurement signals S1, S2a, and S2b are input to each of the arithmetic units 273a and 273b, and output signals calculated on the basis of those signals are output to the voltage-controlled filter 271 and the voltage-controlled amplifier 272, so that the external sound source signal Sa is modulated. The voltage-controlled amplifier 272 modulates the output signal of the voltage-controlled filter 271 by the output of the arithmetic unit 273b and outputs a control signal S0.

Hereinafter, an operation example of the motion measurement system 7 of this embodiment will be described.

Operation Example 1

The motion measurement system 7 of this embodiment is used to, for example, measure a motion of a body of a player of a musical instrument. In this case, for the external sound source signal Sa, a sound signal output from the musical instrument is used. The detector unit 10 is attached to an arbitrary part of the body of the player, and the output unit 30 is configured integrally with the musical instrument or configured as a different device.

In the motion measurement system 7, arithmetic expressions of the arithmetic units 273a and 273b are optimized such that a tone or a volume changes depending on measurement results of the motion feature amount of the body (tangential velocity, normal acceleration, elevation angle, etc.), with the external sound source signal Sa being as a reference sound. In general, when a musical instrument is being played, a body part that is not in contact with the musical instrument also moves. In this regard, a sound generated depending on the motion feature amount is to be superimposed on the instrument sound, and thus a sound that cannot be generated by only the musical instrument is generated. This can expand the range of expression and impart extensibility to the instrument sound.

Operation Example 2

The motion measurement system 7 of this embodiment can be used in the practice of playing a musical instrument, for example. In this case, for the external sound source signal Sa, a signal of the performance sound of the musical instrument that is picked up by a microphone is used. The detector unit 10 is attached to a body part of the player, e.g., a finger or an arm. Further, the motion measurement system 7 is configured such that a third signal S3 for adjusting an acceptable motion error can be input to the arithmetic units 273a and 273b (FIG. 26).

The motion measurement system 7 measures a motion of a finger or the like of the user playing the musical instrument and compares the motion feature amount thereof with an acceptable motion error value. If the motion feature amount does not exceed the acceptable range, the motion measurement system 7 outputs appropriate sound corresponding to the instrument sound, and if the motion feature amount exceeds the acceptable range, the motion measurement system 7 outputs sound to which a changed tone or volume is added to the extent recognizable to the player. This enables the motion of a finger suitable for playing to be intuitively understood. The third signal S3 may be configured such that the user can arbitrarily set the third signal S3 by adjustment of a parameter or the like.

In addition, the motion measurement system 7 may be configured such that a tone or a volume can be changed depending on the motion feature amount of a gesture in a conversation or a speech. This makes it possible to strengthen an impression to be given to a listener. Furthermore, in the performance of a musical instrument or the like, there are a lot of repetitive operations. Thus, for example, by not only using the motion feature amounts measured in the operation examples 1 and 2 in real time but also modeling a habit in playing or the like from the past motion feature amount data, a change in tone or volume may be given on the basis of a quantitative evaluation thereof.

Hereinabove, the embodiments of the present technology have been described, but the present technology is not limited to the embodiments described above and can be variously modified as a matter of course.

For example, in the embodiments described above, the motion measurement system applied to the pitching practice of the user has been mainly described as an example, but the motion measurement system is not limited thereto as a matter of course and is applicable to a practice using an exercise tool such as a golf club or a bat. In this case, the detector unit may be attached to the user or may be attached to the exercise tool. Further, the present technology is also applicable to the practice of dances, communication using a gesture, ecological survey of animals, and the like.

Further, setting of the sensor device 1A may be configured to be changeable by the terminal device 1B. In this case, for example, it may be possible to select a type of kinematic physical quantity to be extracted from the terminal device 1B or invalidate a modulation function by the second measurement signals S2a and S2b.

Furthermore, in the embodiments described above, the example in which the measurement signal Sw is output as a sound signal has been mainly described, but the present technology is not limited thereto as a matter of course. Another signal such as light or vibration may be output, or signals of sound, light (illumination), vibration, and the like may be output in combination. For example, diverse expressions such as expressing a motion by using sound and expressing a posture or a trajectory by using illumination are applicable.

It should be noted that the present technology can also have the following configurations.

(1) A motion measurement apparatus, including:
a detector unit that is to be attached to a detection target and detects velocity-related information, the velocity-related information being related to temporal changes in velocities in three-axis directions of the detection target being in motion in a space;
a controller unit that extracts a motion feature amount including one or a plurality of kinematic physical quantities of the detection target on the basis of the velocity-related information; and
an output unit that outputs a perceivable measurement signal, the perceivable measurement signal changing depending on the motion feature amount.

(2) The motion measurement apparatus according to (1), in which
the controller unit extracts a first kinematic physical quantity and a second kinematic physical quantity as the motion feature amount and generates a modulation signal obtained by modulating a first measurement signal corresponding to the first kinematic physical quantity by a second measurement signal corresponding to the second kinematic physical quantity, and
the output unit generates the measurement signal on the basis of the modulation signal.

(3) The motion measurement apparatus according to (2), in which
the controller unit includes
an arithmetic unit that extracts the motion feature amount, and
a modulator unit that generates the modulation signal.

(4) The motion measurement apparatus according to (2) or (3), in which
the controller unit extracts a tangential velocity of the detection target as the first kinematic physical quantity.

(5) The motion measurement apparatus according to any one of (2) to (4), in which
the controller unit extracts at least one of an acceleration, a normal acceleration, and a motion elevation angle of the detection target as the second kinematic physical quantity.

(6) The motion measurement apparatus according to any one of (1) to (5), in which
the output unit includes a sound-emitting element that is capable of emitting a sound wave as the measurement signal.

(7) The motion measurement apparatus according to any one of (1) to (5), in which
the output unit includes a light-emitting element that is capable of emitting light as the measurement signal.

(8) The motion measurement apparatus according to any one of (1) to (7), in which
the detector unit includes an acceleration sensor unit that detects accelerations in the three-axis directions.

(9) The motion measurement apparatus according to (8), in which
the detector unit further includes an angular velocity sensor unit that detects angular velocities about the three axes.

(10) An information processing apparatus, including
a controller unit that
extracts a motion feature amount including one or a plurality of kinematic physical quantities of a detection target being in motion in a space on the basis of velocity-related information, the velocity-related information being related to temporal changes in velocities in three-axis directions of the detection target, and
generates a control signal for controlling an output unit capable of generating a perceivable measurement signal, the perceivable measurement signal changing depending on the motion feature amount.

(11) The information processing apparatus according to (10), further including
a detector unit that acquires the velocity-related information.

(12) An information processing apparatus, including:
a controller unit that extracts a motion feature amount including one or a plurality of kinematic physical quantities of a detection target being in motion in a space on the basis of velocity-related information, the velocity-related information being related to temporal changes in velocities in three-axis directions of the detection target; and an output unit that generates a perceivable measurement signal, the perceivable measurement signal changing depending on the motion feature amount.

(13) A motion measuring method, including:

acquiring velocity-related information, the velocity-related information being related to temporal changes in velocities in three-axis directions of a detection target being in motion in a space;

extracting a motion feature amount including one or a plurality of kinematic physical quantities of the detection target on the basis of the velocity-related information; and generating a perceivable measurement signal that changes depending on the motion feature amount.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 to 7, 101 to 106 motion measurement apparatus (motion measurement system)
1A sensor device
1B terminal device
10 detector unit
12 acceleration sensor unit
13 angular velocity sensor unit
20 controller unit
21 feature amount extraction unit
30 output unit
211 arithmetic circuit
212 signal generation circuit
S0 control signal
S1 first measurement signal
S2a, S2b second measurement signal
Sw measurement signal
Vo velocity-related information

The invention claimed is:

1. A motion measurement apparatus, comprising:
a detector unit that is to be attached to a detection target and detects velocity-related information, the velocity-related information being related to temporal changes in velocities in three-axis directions of the detection target being in motion in a space;
a controller unit that extracts a motion feature amount including one or a plurality of kinematic physical quantities of the detection target on the basis of the velocity-related information; and
an output unit that outputs a perceivable measurement signal, the perceivable measurement signal changing depending on the motion feature amount,
wherein the controller unit includes a first sound signal generation circuit and a second sound signal generation circuit,
wherein the first sound signal generation circuit generates a first sound signal to the output unit in a case that the motion feature amount is larger than a predetermined value of at least one kinematic physical quantity, and
wherein the second sound signal generation circuit generates a second sound signal to the output unit in a case that the motion feature amount is equal to or smaller than the predetermined value of the at least one kinematic physical quantity.

2. The motion measurement apparatus according to claim 1, wherein
the controller unit extracts a first kinematic physical quantity and a second kinematic physical quantity as the motion feature amount and generates a modulation signal obtained by modulating a first measurement signal corresponding to the first kinematic physical quantity by a second measurement signal corresponding to the second kinematic physical quantity, and
the output unit generates the measurement signal on the basis of the modulation signal.

3. The motion measurement apparatus according to claim 2, wherein
the controller unit includes
an arithmetic unit that extracts the motion feature amount, and
a modulator unit that generates the modulation signal.

4. The motion measurement apparatus according to claim 2, wherein
the controller unit extracts a tangential velocity of the detection target as the first kinematic physical quantity.

5. The motion measurement apparatus according to claim 2, wherein
the controller unit extracts at least one of an acceleration, a normal acceleration, and a motion elevation angle of the detection target as the second kinematic physical quantity.

6. The motion measurement apparatus according to claim 1, wherein
the output unit includes a sound-emitting element that is capable of emitting a sound wave as the measurement signal.

7. The motion measurement apparatus according to claim 1, wherein
the output unit includes a light-emitting element that is capable of emitting light as the measurement signal.

8. The motion measurement apparatus according to claim 1, wherein
the detector unit includes an acceleration sensor unit that detects accelerations in the three-axis directions.

9. The motion measurement apparatus according to claim 8, wherein
the detector unit further includes an angular velocity sensor unit that detects angular velocities about the three axes.

10. An information processing apparatus, comprising
a controller unit that
extracts a motion feature amount including one or a plurality of kinematic physical quantities of a detection target being in motion in a space on the basis of velocity-related information, the velocity-related information being related to temporal changes in velocities in three-axis directions of the detection target, and
generates a control signal for controlling an output unit capable of generating a perceivable measurement signal, the perceivable measurement signal changing depending on the motion feature amount,
wherein the controller unit includes a first sound signal generation circuit and a second sound signal generation circuit,
wherein the first sound signal generation circuit generates a first sound signal to the output unit in a case that the motion feature amount is larger than a predetermined value of at least one kinematic physical quantity, and wherein the second sound signal generation circuit generates a second sound signal to the output unit in a case that the motion feature amount is equal to or smaller than the predetermined value of the at least one kinematic physical quantity.

11. The information processing apparatus according to claim 10, further comprising
a detector unit that acquires the velocity-related information.

12. An information processing apparatus, comprising:
a controller unit that extracts a motion feature amount including one or a plurality of kinematic physical quantities of a detection target being in motion in a space on the basis of velocity-related information, the velocity-related information being related to temporal changes in velocities in three-axis directions of the detection target; and
an output unit that generates a perceivable measurement signal, the perceivable measurement signal changing depending on the motion feature amount,
wherein the controller unit includes a first sound signal generation circuit and a second sound signal generation circuit,
wherein the first sound signal generation circuit generates a first sound signal to the output unit in a case that the motion feature amount is larger than a predetermined value of at least one kinematic physical quantity, and
wherein the second sound signal generation circuit generates a second sound signal to the output unit in a case that the motion feature amount is equal to or smaller than the predetermined value of the at least one kinematic physical quantity.

13. A motion measuring method, comprising:
acquiring velocity-related information, the velocity-related information being related to temporal changes in velocities in three-axis directions of a detection target being in motion in a space;
extracting, by a controller unit, a motion feature amount including one or a plurality of kinematic physical quantities of the detection target on the basis of the velocity-related information; and
generating a perceivable measurement signal that changes depending on the motion feature amount,
wherein the controller unit includes a first sound signal generation circuit and a second sound signal generation circuit,
wherein the first sound signal generation circuit generates a first sound signal to the output unit in a case that the motion feature amount is larger than a predetermined value of at least one kinematic physical quantity, and
wherein the second sound signal generation circuit generates a second sound signal to the output unit in a case that the motion feature amount is equal to or smaller than the predetermined value of the at least one kinematic physical quantity.

* * * * *